United States Patent
Meier et al.

(10) Patent No.: US 11,566,206 B2
(45) Date of Patent: *Jan. 31, 2023

(54) MULTI-COMPONENT DETERGENT COMPRISING CATECHOL METAL COMPLEX

(71) Applicant: Henkel AG & Co. KGaA, Duesseldorf (DE)

(72) Inventors: Frank Meier, Duesseldorf (DE); Mareile Job, Leverkusen (DE); Christian Kropf, Hilden (DE); Ulrich Pegelow, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 108 days.

This patent is subject to a terminal disclaimer.

(21) Appl. No.: 17/228,601

(22) Filed: Apr. 12, 2021

(65) Prior Publication Data

US 2021/0230514 A1 Jul. 29, 2021

Related U.S. Application Data

(63) Continuation of application No. PCT/EP2019/065989, filed on Jun. 18, 2019.

(30) Foreign Application Priority Data

Oct. 11, 2018 (DE) .................... 10 2018 217 392.3

(51) Int. Cl.

| | |
|---|---|
| C11D 17/04 | (2006.01) |
| C11D 11/00 | (2006.01) |
| C11D 1/83 | (2006.01) |
| C11D 3/16 | (2006.01) |
| C11D 3/40 | (2006.01) |
| C07F 11/00 | (2006.01) |
| C07F 13/00 | (2006.01) |
| C07F 15/02 | (2006.01) |
| C09B 57/10 | (2006.01) |
| C11D 3/43 | (2006.01) |

(Continued)

(52) U.S. Cl.
CPC ............ *C11D 3/168* (2013.01); *C07F 11/005* (2013.01); *C07F 13/005* (2013.01); *C07F 15/025* (2013.01); *C09B 57/10* (2013.01); *C11D 1/83* (2013.01); *C11D 3/40* (2013.01); *C11D 3/43* (2013.01); *C11D 11/0017* (2013.01); *C11D 17/045* (2013.01); *C11D 1/22* (2013.01); *C11D 1/72* (2013.01)

(58) Field of Classification Search
None
See application file for complete search history.

(56) References Cited

U.S. PATENT DOCUMENTS

| | | | |
|---|---|---|---|
| 10,876,076 B2 | 12/2020 | Kropf et al. | |
| 2009/0176684 A1 | 7/2009 | Gardner et al. | |

(Continued)

FOREIGN PATENT DOCUMENTS

| | | |
|---|---|---|
| DE | 102014222833 A1 | 5/2016 |
| EP | 1305432 B1 | 9/2010 |

(Continued)

OTHER PUBLICATIONS

Meyer, M. et al. "Rearrangement Reactions in Dinuclear Triple Helicates," Inorg. Chem., 1997, vol. 36, pp. 5179-5191.*

(Continued)

*Primary Examiner* — Lorna M Douyon
(74) *Attorney, Agent, or Firm* — Bojuan Deng

(57) ABSTRACT

A multi-component detergent, including at least two components, that is contained in a container having at least two chambers, wherein a first component K1 is a first liquid composition, containing at least one catechol metal complex compound of formula (I)

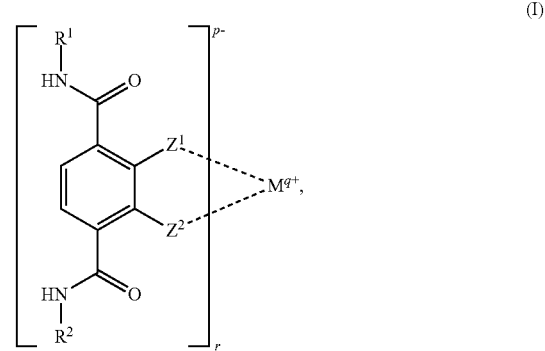

and at least one free catechol compound of formula (II) or the salt thereof

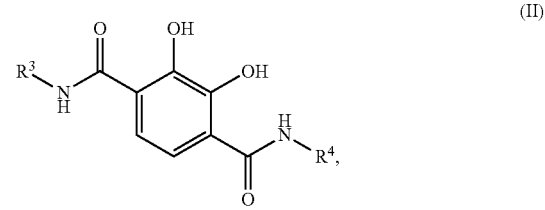

with the proviso that the catechol compound of formula (II) and the salt thereof are different from the compounds of formula (I), and a second component K2 is a second liquid composition, containing at least one surfactant. The present invention further relates to the use of the multi-component detergent for removing bleachable stains and a method for washing textiles using the multi-component detergent.

19 Claims, No Drawings

(51) Int. Cl.
   *C11D 1/22*   (2006.01)
   *C11D 1/72*   (2006.01)

(56) References Cited

U.S. PATENT DOCUMENTS

| | | | |
|---|---|---|---|
| 2017/0240849 A1* | 8/2017 | Kropf | ................... C11D 3/2093 |
| 2018/0016527 A1 | 1/2018 | Reinoso Garcia et al. | |
| 2019/0169544 A1* | 6/2019 | Kropf | ................... C11D 7/3263 |
| 2021/0230514 A1 | 7/2021 | Meier et al. | |

FOREIGN PATENT DOCUMENTS

| | | | |
|---|---|---|---|
| GB | 1296839 | A | 11/1972 |
| WO | 9206165 | A1 | 4/1992 |
| WO | 9623873 | A1 | 8/1996 |
| WO | 9629397 | A1 | 9/1996 |
| WO | 9703160 | A1 | 1/1997 |
| WO | 9714804 | A1 | 4/1997 |
| WO | 9812307 | A1 | 3/1998 |
| WO | 0060060 | A2 | 10/2000 |
| WO | 0060063 | A1 | 10/2000 |
| WO | 0146700 | A2 | 6/2001 |
| WO | 0166712 | A2 | 9/2001 |
| WO | 0210356 | A2 | 2/2002 |
| WO | 02099091 | A2 | 12/2002 |
| WO | WO 2006/133773 A1 * | | 12/2006 |
| WO | WO 2006/133790 A1 * | | 12/2006 |
| WO | WO 2010/072511 A2 * | | 7/2010 |
| WO | 2011023716 | A1 | 3/2011 |
| WO | 2013092263 | A1 | 6/2013 |

OTHER PUBLICATIONS

PCT International Search Report & Written Opinion PCT/EP2019/065989 Completed: Sep. 30, 2019; dated Oct. 10, 2019 11 pages.

* cited by examiner

MULTI-COMPONENT DETERGENT COMPRISING CATECHOL METAL COMPLEX

FIELD OF THE INVENTION

The present invention relates to a multi-component detergent which comprises a first liquid component K1 that contains at least one catechol compound, and comprises a second liquid component K2 that contains at least one surfactant. The present invention further relates to the use of the multi-component detergent for removing bleachable stains and a method for washing textiles using the multi-component detergent.

BACKGROUND OF THE INVENTION

While the formulation of powdered detergents and washing and cleaning agents containing bleaching agent no longer poses any problems, the formulation of stable liquid washing and cleaning agents containing bleaching agent continues to be problematic. Due to the usual absence of the bleaching agent in liquid washing and cleaning agents, stains of this kind which are normally removed in particular due to the bleaching agents contained, are thus frequently only inadequately removed. A similar problem also exists for bleaching agent-free color detergents in which the bleaching agent is omitted in order to protect the dyes in the textiles and prevent them from fading. If there is no bleaching agent, the situation is aggravated by the fact that, instead of removing the bleachable stains which are normally at least partly removed by using peroxygen-based bleaching agent, the washing process often intensifies the stain and/or makes it harder to be able to remove the stain, which may be due to initiated chemical reactions which may consist, for example, in the polymerization of particular dyes contained in the stains.

Such problems occur in particular in stains which contain polymerizable substances. The polymerizable substances are primarily polyphenolic dyes, preferably flavonoids, in particular from the class of anthocyanidins or anthocyanins. The stains can in particular have been caused by food products or beverages which contain the corresponding dyes. The stains can in particular be stains from fruits or vegetables or also red wine stains which in particular contain polyphenolic dyes, especially those from the class of anthocyanidins or anthocyanins.

International patent application WO 2011/023716 A1 discloses the use of gallic acid esters, such as propyl gallate, in washing and cleaning agents for improved removal of stains which contain polymerizable substances.

The international patent application WO 2013/092263 A1 relates to the improvement of the performance of washing and cleaning agents by using oligohydroxybenzoic acid amides.

German patent applications DE 102016214660 A1 and DE 102014222833 relate to the use of dihydroxyterephthalic acid derivatives in washing and cleaning agents in order to improve washing or cleaning performance. The washing and cleaning agents in these publications have an alkaline pH.

Appearance plays an important role in liquid detergents, in particular in transparent or translucent bottles or in pre-portioned products such as pouches. In particular, products with strong, intense colors are wanted by the consumer. A risk when using new dyes and/or high amounts of dyes is that these dyes are absorbed onto textiles during the washing process and that a local or uniform discoloration occurs. The effect can be measured in laboratory tests by the "staining tendency" and can also be perceived visually by the consumer. The washed garment may be irreversibly damaged and the discoloration may not be able to be removed even if the garment is washed again.

If the components of a multi-component detergent are enclosed separately from one another in different chambers of a water-soluble container, it is also advantageous if the color of the components does not transfer onto the wrapping and color said wrapping at the point of contact or even migrate through the material of the wrapping into another chamber and discolor the composition contained therein.

BRIEF SUMMARY OF THE INVENTION

The object of the present invention is therefore that of providing a multi-component detergent which has an intense color when stored and is color-stable, but does not discolor textiles in the washing process.

The inventors of the present invention have surprisingly found that this object is possible by using special catechol metal complex compounds as a dye. The use of specific catechol metal complex compounds reduces the risk of undesired textiles staining since said complex compounds have a very low affinity for natural and synthetic fabrics. In addition, water-soluble materials of the container are not colored by these new dyes. Migration of the dye is prevented.

In addition, multi-component detergents comprising the catechol metal complex compounds according to the invention demonstrate a good bleaching action in the presence of an excess of free catechol ligands. The detergents are particularly advantageous in their cleaning action against stains which can only be removed by bleaching. These stains are those which contain polymerizable substances. The polymerizable substances are primarily polyphenolic dyes, preferably flavonoids, in particular from the class of anthocyanidins or anthocyanins. The stains can in particular have been caused by food products or beverages which contain the corresponding dyes. The stains can in particular be stains from fruits or vegetables or also red wine stains which in particular contain polyphenolic dyes, especially those from the class of anthocyanidins or anthocyanins.

DETAILED DESCRIPTION OF THE INVENTION

A first object of the present invention is therefore a multi-component detergent, comprising at least two components, that is contained in a container having at least two chambers, wherein
a first component K1 is a first liquid composition, containing at least one catechol metal complex compound of formula (I)

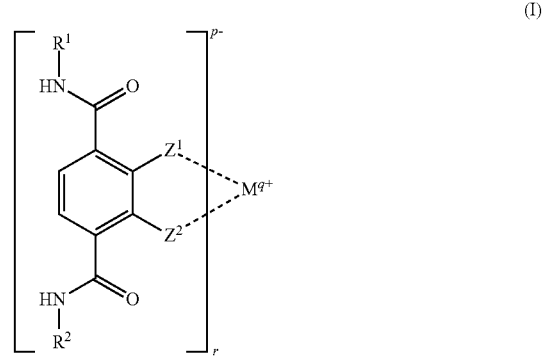

where
R and $R^2$ represent, independently of one another, a hydrocarbon functional group having 1 to 20 carbon atoms that is optionally substituted by at least one functional group selected from hydroxy, $(C_1-C_4)$-alkoxy, $(C_1-C_4)$-alkoxy $(CH_2CH_2O)_n$—, —NR'R" or —N+R'R"R"'X$^-$, where n=1 to 10, R', R" and R"' represent, independently of one another, H or a linear or branched aliphatic hydrocarbon functional group having 1 to 3, preferably 1 to 2, carbon atoms and X$^-$ represents an anion, $Z^1$ and $Z^2$ represent, independently of one another, OH or O$^-$, M represents a metal cation of a transition metal or lanthanide, (in particular a metal cation made of Ti, Zr, Hf, V, Nb, Ta, Cr, Mo, W, Mn, Fe, Ru, Co, Ni, Cu, Zn, Ce or Sm), q represents, as a charge number of the metal cation M, the number 2, 3 or 4, p represents, as a charge number of the catechol ligand, the number 0, 1 or 2, r represents the number 1, 2, 3 or 4, and at least one free catechol compound of formula (II) or the salt thereof

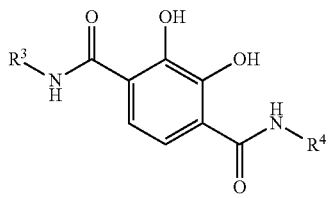

(II)

where

R$^3$ and R$^4$ represent, independently of one another, a hydrocarbon functional group having 1 to 20 carbon atoms that is optionally substituted by at least one functional group selected from hydroxy, $(C_1-C_4)$-alkoxy, $(C_1-C_4)$-alkoxy $(CH_2CH_2O)_n$—, —NR'R" or N+R'R"R"'. X$^-$, where n=1 to 10, R', R" and R"' represent, independently of one another, H or a linear or branched aliphatic hydrocarbon functional group having 1 to 3, preferably 1 to 2, carbon atoms and X$^-$ represents an anion, with the proviso that the catechol compound of formula (II) and the salt thereof are different from the compounds of formula (I), and a second component K2 is a second liquid composition, containing at least one surfactant.

The water content as defined herein refers to the water content as determined by means of Karl Fischer titration (Angewandte Chemie 1935, 48, 394-396; ISBN 3-540-12846-8 Eugen Scholz).

"Liquid," when used herein in relation to the compositions according to the invention, includes all compositions which are flowable under standard conditions (20° C., 1013 mbar) and in particular also includes gels and pasty compositions. In particular, the term also includes non-Newtonian liquids which have a yield point.

Unless otherwise indicated, all stated amounts indicated in connection with the constituents of the detergent described herein refers to wt. %, in each case based on the total weight of the composition. Moreover, stated amounts of this kind that refer to at least one constituent always refer to the total amount of this type of constituent contained in the detergent, unless explicitly indicated otherwise. This means that stated amounts of this kind, for example in connection with "at least one non-ionic surfactant," refer to the total amount of non-ionic surfactant contained in the detergent.

"At least one," as used herein, refers to 1 or more, for example 1, 2, 3, 4, 5, 6, 7, 8, 9 or more. In connection with constituents of the compositions described herein, this information does not refer to the absolute amount of molecules, but rather to the type of the constituent. "At least one non-ionic surfactant" therefore signifies, for example, one or more different non-ionic surfactants, i.e. one or more different types of non-ionic surfactants. Together with stated amounts, the stated amounts refer to the total amount of the correspondingly designated type of constituent, as defined above.

"Substantially free," as used herein, signifies that the particular compound is contained in less than 0.01 wt. % (i.e. 0 to less than 0.01 wt. %), preferably in less than 0.001 wt. % (i.e. 0 to less than 0.001 wt. %), more preferably in less than 0.0001 wt. % (i.e. 0 to less than 0.0001 wt. %), of the particular component or composition, and most preferably is not contained at all therein.

If, in the context of the application, numerical ranges are defined from one number to another number, the limit values are included in the range.

If, in the context of the application, numerical ranges are defined between one number and another number, the limit values are not included in the range.

A chemical compound is an organic compound if the molecule of the chemical compound contains at least one covalent bond between carbon and hydrogen. This definition applies mutatis mutandis to, inter alia, "organic bleach activators" as the chemical compound.

By implication from the definition of an organic compound, a chemical compound is an inorganic compound if the molecule of the chemical compound does not contain a covalent bond between carbon and hydrogen.

If compounds are described as "substituted" in the present invention, the possible substituents are known to a person skilled in the art. Particularly preferably, unless explicitly stated otherwise, the substituents are selected from —F, —Cl, —Br, —I, —OH, =O, —OR$^1$, —NH$_2$, —NHR$^1$, —NR$^1_2$ and —COOR$^1$, where R$^1$ is an alkyl functional group having 1 to 10 carbon atoms.

According to the present invention, the components are spatially separated from one another.

The present invention contains at least two liquid components K1 and K2; further components can also be solid or be a granulate. It is preferred that all components are liquid. If further liquid components are present, they can be defined like K1 or K2. Multi-component detergents according to the invention are preferably characterized in that they contain at least one further component, the further components each being defined as component K2 or being a powdery composition or a granulate.

Unless explicitly stated otherwise, if molecular masses or relative molecular masses or molar masses are described in the present invention, the number average molecular weight MN, which can be determined by means of gel permeation chromatography using polystyrene standards, is used.

In complex chemistry, "ligand" refers to molecules which, in the presence of a substance (e.g. a metal ion) functioning as a central atom or a central ion, are bound to this substance to form a complex. As a "free ligand" or "uncomplexed ligand", the ligand is present in an uncomplexed form, unbound without grouping around a central atom or central ion.

Preferred multicomponent detergents contain, substantially only in component K1, the catechol metal complex compounds of formula (I) and the free catechol compounds of formula (II). This means that preferred multi-component detergents are characterized in that the second component and optionally present additional components of the multi-component detergent are substantially free of compounds of formula (I) and compounds of formula (II). It is particularly preferred if component K2 and the optionally additionally present components of the multi-component detergent each contain less than 0.001 wt. % of compounds of formula (I) and each contain less than 0.001 wt. % of compounds of formula (II).

The catechol metal complex compounds of formula (I) can be present as complex cations (q>r·p), as a complex anion (q<r·p) or as a neutral complex (q=r·p). In the first case, the cationic charge of the complex cation is compensated for by a corresponding anion equivalent while maintaining electroneutrality; the anion equivalent is preferably selected from the preferred anions suitable for $X^-$ of formula (I) (vide infra).

In the second case, the anionic charge of the complex cation is compensated for by a corresponding cation equivalent while maintaining electroneutrality.

The functional groups $R^1$ and $R^2$ according to formula (I) represent, independently of one another, a said $C_1$-$C_{20}$ hydrocarbon functional group. The hydrocarbon functional groups having 1 to 20 carbon atoms in formula (I) can be linear or branched, saturated or unsaturated, cyclic or alicyclic or aromatic. Functional groups of this kind are preferably selected from $C_1$-$C_{20}$-alkyl, $C_1$-$C_{20}$-alkenyl, $C_6$-$C_{20}$-aryl and alkylaryl having a total of 7 to 20 carbon atoms (e.g. benzyl), each of which is optionally substituted by at least one functional group, selected from hydroxy, ($C_1$-$C_4$)-alkoxy, ($C_1$-$C_4$)-alkoxy($CH_2CH_2O$)$_n$—, —NR'R'' or —$N^+$R'R''R'''$X^-$, where n=1 to 10, R', R'' and R''' represent, independently of one another, H or a linear or branched aliphatic hydrocarbon radical having 1 to 3, preferably 1 to 2, carbon atoms and $X^-$ represents an anion.

Preferably suitable catechol metal complex compounds of formula (I) are characterized in that in formula (I) the functional groups $R^1$ and $R^2$ represent, independently of one another, an alkyl group, an alkoxyalkyl group, a hydroxyalkyl group, a hydroxyalkyloxyalkyl group, (N-hydroxyethyl)-aminoethyl, (N-methoxyethyl)-aminoethyl or (N-ethoxyethyl)-aminoethyl, or an aromatic group.

According to formula (I), preferred alkyl groups are linear ($C_1$-$C_{10}$)-alkyl groups or branched ($C_3$-$C_{10}$)-alkyl groups or $C_5$-$C_6$-cycloalkyl. Methyl, ethyl, n-propyl, isopropyl, n-butyl, sec-butyl, tert-butyl, iso-butyl, n-pentyl, iso-pentyl, neopentyl and hexyl are particularly preferred alkyl groups according to formula (I) (most preferably methyl, ethyl, n-propyl and isopropyl).

According to formula (I), preferred alkenyl groups are allyl, vinyl and butenyl.

Preferred alkoxyalkyl groups of formula (I) are methoxyethyl, methoxypropyl, (2-methoxy)-ethoxyethyl, ethoxyethyl, ethoxypropyl or (2-ethoxy)-ethoxyethyl.

According to formula (I), preferred hydroxyalkyl groups are 2-hydroxyethyl, 3-hydroxypropyl, 2-hydroxypropyl and 1,2-dihydroxypropyl.

Preferred hydroxyalkyloxyalkyl groups according to formula (I) are 2-hydroxyethoxyethyl. The functional groups $R^1$ and $R^2$ of formula (I) particularly preferably represent, independently of one another, methyl, ethyl, n-propyl, iso-propyl, n-butyl, sec-butyl, tert-butyl, isobutyl, n-pentyl, iso-pentyl, neopentyl, hexyl, allyl, butenyl, 2-hydroxyethyl, 2-hydroxypropyl, 3-hydroxypropyl, 1,2-dihydroxypropyl, 2-methoxyethyl, 2-ethoxyethyl, 2-methoxypropyl, 3-methoxypropyl, 2-ethoxypropyl, 3-ethoxypropyl, 2-(N-hydroxyethyl)-aminoethyl, 2-(N-methoxyethyl)-aminoethyl or 2-(N-ethoxyethyl)-aminoethyl, benzyl or phenyl.

It has proven to be particularly preferred if the functional groups $R^1$ and $R^2$ in formula (I) are the same. Most preferably $R^1$ and $R^2$ represent methyl, ethyl, n-propyl, isopropyl, n-butyl, sec-butyl, tert-butyl, iso-butyl, n-pentyl, iso-pentyl, neopentyl, hexyl, 2-hydroxyethyl, 2-hydroxypropyl, 3-hydroxypropyl, 2-methoxyethyl, 2-ethoxyethyl, 2-methoxypropyl, 3-methoxypropyl, 2-ethoxypropyl and 3-ethoxypropyl. Methyl, ethyl, n-propyl and iso-propyl are extremely preferred groups for $R^1$ and $R^2$ of the catechol metal complex compounds of formula (I).

According to formula (I), $X^-$ is preferably selected from the group comprising lactate, citrate, tartrate, succinate, perchlorate, tetrafluoroborate, hexafluorophosphate, alkyl sulfonate, alkyl sulfate, hydrogen sulfate, sulfate, dihydrogen phosphate, hydrogen phosphate, phosphate, isocyanate, rhodanide, nitrate, fluoride, chloride, bromide, hydrogen carbonate and carbonate, and mixtures of at least two of these are, it being possible to ensure the charge balance in the presence of polyvalent anions by the presence of a plurality of cationic backbones of general formula (I) or optionally by the presence of additional cations such as sodium or ammonium ions.

The dashed lines according to formula (I) represent coordinative bonds of the ligand to the metal cation M.

The most preferred catechol compounds of formula (I) are the compounds of formulas (I-a) and/or (I-b).

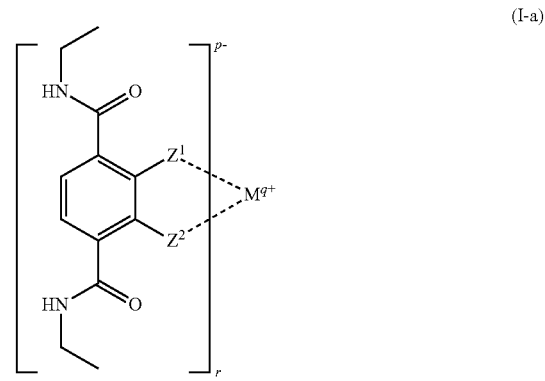

(I-a)

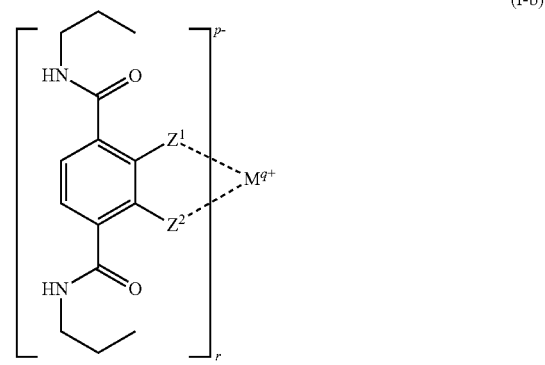

(I-b)

where $Z^1$, $Z^2$, p, r, q and M are defined according to formula (I).

The catechol metal complex compounds of the present invention contain a metal cation M which represents a metal cation of a transition metal or lanthanide. A person skilled in the art understands a transition metal to be metals from the transition elements of the periodic table of elements in accordance with the definition given according to IUPAC Rule I-3.8.2 of inorganic chemistry. Lanthanides are known to the person skilled in the art as lanthanum and the elements of the rare earth metals having atomic numbers 58 to 70 that follow lanthanum.

Preferred catechol metal complex compounds of formulas (I), (I-a) and (I-b) contain a metal cation M selected from Ti, Zr, Hf, V, Nb, Ta, Cr, Mo, W, Mn, Fe, Ru, Co, Ni, Cu, Zn, Ce, Sm or hydrates of these metal ions. Among these, the catechol metal complex compounds of formula (I) are particularly suitable, in which in formula (I), M as a metal cation, is selected from a metal cation of Fe, Mn, Cr, Ni, Co, Ce, Cu or hydrates of these metal ions (in particular selected from Fe(II), Fe(III), Mn(II), Mn(IV), Ni(II), Co(II), Co(III), Ce(III), Cu(II) or hydrates of these metal ions).

The catechol metal complex compounds of formulas (I), (I-a) and (I-b) are colored. Preferred catechol-metal complex compounds of formula (I) are characterized in that they absorb light in a wavelength of 400 to 800 nm, measured by means of a UV-VIS spectrophotometer (e.g. Specord® S 600 with photodiode array by the company Analytik Jena AG) at a concentration of the complex of $10^5$ mol/L in water at 20° C., a pH of 8 and a layer thickness of 1 cm.

The catechol metal complex compounds of formula (I) according to the invention can be provided in which $0.1\tau$ mmol free ligand in the form of the corresponding catechol compound can be dissolved in 10 mL methanol. $0.1\tau$ mmol KOH is added (as 0.5M solution in methanol) (r is as defined in formula (I) (vide supra)). 0.1 mmol of the metal chloride is dissolved in 4 mL methanol, and this solution is added to the first solution. The mixture is stirred for one hour, the resulting solution is concentrated to 4 ml and 50 ml diethyl ether are added. The precipitated metal complex is isolated by filtration.

It is preferred if the catechol metal complex compound of formula (I) is contained in component K1 in a total amount of from 0.001 to 10.0 wt. %, preferably 0.01 to 3.0 wt. %, based on the total weight of the first liquid composition. It is again particularly preferred if component K2 and optionally present further components of the multi-component detergent are substantially free of compounds of formula (I) and compounds of formula (II), preferably if component K2 and the optionally present further components of the multi-component detergent each contain less than 0.001 wt. % of compounds of formula (I) and each contain less than 0.001 wt. % of compounds of formula (II).

Component K1 of the multi-component detergent according to the invention contains at least one free catechol compound according to formula (II). The "free catechol compound" of formula (II) is present in the context of the above requirement as an uncomplexed ligand and/or as a complex which is different from compounds of formula (I). The salt of the free catechol compound of formula (II) is present in deprotonated form on at least one of the OH groups which bind directly to the catechol phenyl ring, the negative charge which is formed being neutralized by a corresponding cation equivalent. The salt of the free catechol compound can be present in dissociated form in the detergent according to the invention and/or can be a complex to a cation equivalent as the central ion, said cation equivalent being different from the metal cation M of formula (I).

Preferred cation equivalents of the salt of the free catechol compound of formula (II) are selected from alkali metal ion (preferably $Na^+$ or $K^+$), alkaline-earth metal ion (preferably $Ca^{2+}$ or $Mg^{2+}$), ammonium ion and alkanolammonium ion. Preferred alkanolammonium ions are 2-ammonioethan-1-ol, tris(2-hydroxyethyl)ammonium, 3-ammoniopropan-1-ol, 4-ammoninbutan-1-ol, 5-amnoniopentan-1-ol, 1-ammoniopropan-2-ol, 1-ammoniobutan-2-ol, 1-ammoniopentan-2-ol, 1-ammoniopentan-3-ol, 1-ammoniopentan-4-ol, 3-ammonio-2-methylpropan-1-ol, 1-ammonio-2-methylpropan-2-ol, 3-ammoniopropan-1,2-diol, 2-ammonio-2-methylpropan-1,3-diol (in particular 2-ammonioethan-1-ol, tris(2-hydroxyethyl)ammonium, 2-ammonio-2-methylpropan-1-ol, 2-ammonio-2-methyl-propan-1,3-diol), or mixtures thereof.

In the multi-component detergent according to the invention, the functional groups $R^3$ and $R^4$ of formula (II) represent, independently of one another, an alkyl group, an alkoxyalkyl group, a hydroxyalkyl group, a hydroxyalkyloxyalkyl group, (N-hydroxyethyl)-aminoethyl, (N-methoxyethyl)-aminoethyl or (N-ethoxyethyl)-aminoethyl, or an aromatic group (preferably methyl, ethyl, n-propyl, isopropyl, n-butyl, sec-butyl, tert-butyl, iso-butyl, n-pentyl, iso-pentyl, neopentyl, hexyl, 2-hydroxyethyl, 2-hydroxypropyl, 3-hydroxypropyl, 2-methoxyethyl, 2-ethoxyethyl, 3-methoxypropyl, 3-ethoxypropyl, (N-hydroxyethyl)-aminoethyl, (N-methoxyethyl)-aminoethyl or (N-ethoxyethyl)-aminoethyl or phenyl).

Preferred compounds of formula (II) are those in which the functional groups $R^3$ and $R^4$ are identical.

The preferred functional groups $R^3$ and $R^4$ of formula (II) are selected from the preferred functional groups $R^1$ and $R^2$ of formula (I).

The functional groups $R^3$ and $R^4$ of formula (II) are very particularly preferably selected depending on the functional groups $R^1$ and $R^2$ of formula (I), the functional groups $R^1$, $R^2$, $R^3$ and $R^4$ being most preferably identical.

Another preferred selected catechol compound of formula (II) is at least one compound of general formula (II-a),

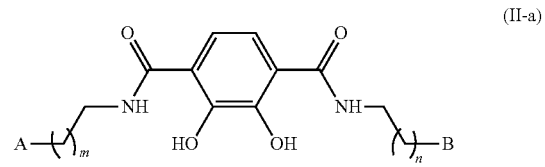

(II-a)

where m and n represent, independently of one another, 0 to 5 and A and B represent, independently of one another, a hydrogen atom, $-NR^1R^2$ and $-N^+R'R^2R^3X^-$, and $R^1$, $R^2$ and $R^3$ represent, independently from one another, H or a linear or branched aliphatic hydrocarbon functional group having 1 to 3, preferably 1 to 2, carbon atoms and X-represents an anion.

Preferred compounds of general formula (II-a) are those in which A and B are identical.

$X^-$ according to formula (II-a) is preferably selected from the group comprising lactate, citrate, tartrate, succinate, perchlorate, tetrafluoroborate, hexafluorophosphate, alkyl sulfonate, alkyl sulfate, hydrogen sulfate, sulfate, dihydrogen phosphate, hydrogen phosphate, phosphate, isocyanate, rhodanide, nitrate, fluoride, chloride, bromide, hydrogen carbonate and carbonate and mixtures of at least two of these, it being possible to ensure the charge balance in the presence of polyvalent anions by the presence of a plurality of cationic backbones of general formula (II) or optionally by the presence of additional cations such as sodium or ammonium ions.

According to the invention, it is preferred if, according to formula (II-a), A and B represent a hydrogen atom.

The most preferred catechol compounds of formula (II) are the compounds of formulas (II-b) and/or (II-c).

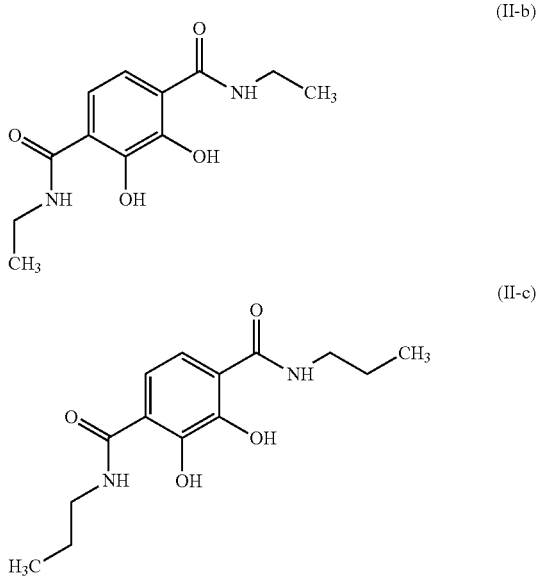

Preferred multi-component detergents according to the invention contain the free catechol compound of formula (II) in component K1 in a total amount of from 0.5 wt. % to 50 wt. %, preferably from 1.0 wt. % to 40 wt. %, more preferably from 3.0 wt. % to 30 wt. %, most preferably from 5.0 wt. % to 20.0 wt. %, based on the total weight of the first liquid composition. It is again particularly preferred if component K2 and optionally present further components of the multi-component detergent are substantially free of compounds of formula (I) and compounds of formula (II), preferably if component K2 and the optionally present further components of the multi-component detergent each contain less than 0.001 wt. % of compounds of formula (I) and each contain less than 0.001 wt. % of compounds of formula (II).

It is preferred if the multi-component detergent according to the invention contains the free catechol compound of formula (II) in a total amount of from 0.1 to 10.0 wt. %, preferably from 0.3 to 3.0 wt. %, based on its total weight. It is again particularly preferred if component K2 and optionally present further components of the multi-component detergent are substantially free of compounds of formula (I) and compounds of formula (II), preferably if component K2 and the optionally present further components of the multi-component detergent each contain less than 0.001 wt. % of compounds of formula (I) and each contain less than 0.001 wt. % of compounds of formula (II).

The second liquid composition of component K2 of the multi-component detergent according to the invention contains at least one surfactant. At least one surfactant can additionally be contained in the further components of said multi-component detergent. In particular, it is preferred if component K1 contains at least one surfactant.

It is again particularly preferred if surfactant is contained in a total amount of from 10 to 70 wt. %, in particular 20 to 65 wt. %, very particularly preferably 30 to 65 wt. %, most preferably 30 to 60 wt. %, based on the weight of the multi-component detergent according to the invention.

The group of surfactants include the non-ionic, anionic, cationic and amphoteric surfactants. According to the invention, the composition can comprise one or more of the surfactants mentioned. The composition particularly preferably comprises at least one or more anion surfactants (anionic surfactants) which are particularly preferably contained in a total amount of from 15 to 50 wt. %, in particular from 20 to 40 wt. %, based on the weight of the multi-component detergent according to the invention.

The at least one anionic surfactant is preferably selected from the group comprising $C_9$-$C_{13}$ alkylbenzene sulfonates, olefin sulfonates, $C_{12}$-$C_{18}$ alkane sulfonates, ester sulfonates, alk(en)yl sulfates, fatty alcohol ether sulfates and mixtures thereof. It has been found that these sulfonate and sulfate surfactants are particularly well suited to preparing stable liquid compositions having a yield point. Multi-component detergent and particularly preferred second liquid compositions, which each comprise $C_9$-$C_{13}$ alkylbenzene sulfonates and fatty alcohol ether sulfates as the anionic surfactant, have particularly good dispersing properties. Surfactants of the sulfonate type that can be used are preferably $C_9$-$C_{13}$ alkylbenzene sulfonates, olefin sulfonates, i.e. mixtures of alkene and hydroxyalkane sulfonates, and disulfonates, as obtained, for example, from $C_{12}$-$C_{18}$ monoolefins having a terminal or internal double bond by way of sulfonation with gaseous sulfur trioxide and subsequent alkaline or acid hydrolysis of the sulfonation products. $C_{12}$-$C_{18}$ alkane sulfonates and the esters of α-sulfofatty acids (ester sulfonates) are also suitable, for example the α-sulfonated methyl esters of hydrogenated coconut, palm kernel or tallow fatty acids.

The alkali salts and in particular the sodium salts of the sulfuric acid half-esters of $C_{12}$-$C_{18}$ fatty alcohols, for example from coconut fatty alcohol, tallow fatty alcohol, lauryl alcohol, myristyl alcohol, cetyl alcohol or stearyl alcohol, or of $C_{10}$-$C_{20}$ oxo alcohols and the half-esters of secondary alcohols having these chain lengths are preferred as alk(en)yl sulfates. From a washing perspective, $C_{12}$-$C_{16}$ alkyl sulfates, $C_{12}$-$C_{15}$ alkyl sulfates and $C_{14}$-$C_{15}$ alkyl sulfates are preferred. 2,3-alkyl sulfates are also suitable anionic surfactants.

The salts of the sulfuric acid half-esters of fatty alcohols having 12 to 18 C atoms, for example from coconut fatty alcohol, tallow fatty alcohol, lauryl alcohol, myristyl alcohol, cetyl alcohol or stearyl alcohol, or of the oxo alcohols having 10 to 20 C atoms and the half-esters of secondary alcohols having these chain lengths are preferred as alk(en)yl sulfates. From a washing perspective, the alkyl sulfates having 12 to 16 C atoms, alkyl sulfates having 12 to 15 C atoms and alkyl sulfates having 14 and 15 C atoms are preferred. 2,3-alkyl sulfates are also suitable anionic surfactants.

Fatty alcohol ether sulfates, such as the sulfuric acid monoesters of straight-chain or branched $C_7$-$C_{21}$ alcohols ethoxylated with 1 to 6 mol ethylene oxide, such as 2-methyl-branched C9-11 alcohols having, on average, 3.5 mol ethylene oxide (EO) or C12-18 fatty alcohols having 1 to 4 EO, are also suitable. Alkyl ether sulfates of formula (A-1) are preferred

In this formula (A-1), $R^1$ represents a linear or branched, substituted or unsubstituted alkyl functional group, preferably a linear, unsubstituted alkyl functional group, particularly preferably a fatty alcohol functional group. Preferred functional groups $R^1$ of formula (A-1) are selected from decyl, undecyl, dodecyl, tridecyl, tetradecyl, pentadecyl, hexadecyl, heptadecyl, octadecyl, nonadecyl, eicosyl functional groups and mixtures thereof, the representatives having an even number of C atoms being preferred. Particularly preferred functional groups $R^1$ of formula (A-1) are derived from fatty alcohols having 12 to 18 C atoms, for example from coconut fatty alcohol, tallow fatty alcohol, lauryl alcohol, myristyl alcohol, cetyl alcohol or stearyl alcohol, or from oxo alcohols having 10 to 20 C atoms.

In formula (A-1), AO represents an ethylene oxide (EO) or propylene oxide (PO) group, preferably an ethylene oxide group. The index n in formula (A-1) is an integer of from 1 to 50, preferably from 1 to 20, and in particular from 2 to 10. Very particularly preferably, n is 2, 3, 4, 5, 6, 7 or 8. X is a monovalent cation or the n-th part of an n-valent cation, the alkali metal ions, including $Na^+$ or $K^+$, being preferred in this case, with $Na^+$ being most preferred. Further cations $X^+$ may be selected from $NH_4^+$, ½ $Zn^{2+}$, ½ $Mg^{2+}$, ½ $Ca^{2+}$, ½ $Mn^{2+}$, and mixtures thereof.

Particularly preferred multi-component detergents and particularly preferred second liquid compositions contain an alkyl ether sulfate selected from fatty alcohol ether sulfates of formula A-2

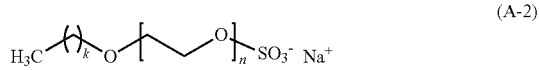

(A-2)

where k=11 to 19, and n=2, 3, 4, 5, 6, 7 or 8. Very particularly preferred representatives are Na fatty alcohol ether sulfates having 12 to 18 C atoms and 2 EO (k=11 to 13, n=2 in formula A-1). The degree of ethoxylation indicated represents a statistical average that can correspond to an integer or a fractional number for a specific product. The degrees of alkoxylation indicated represent statistical averages that can correspond to an integer or a fractional number for a specific product. Preferred alkoxylates/ethoxylates have a narrowed homolog distribution (narrow range ethoxylates, NRE).

It is preferred that the multi-component detergent according to the invention and particularly preferred second liquid compositions contain a mixture of sulfonate and sulfate surfactants. In a particularly preferred embodiment, the composition contains C9-13 alkylbenzene sulfonates and optionally also fatty alcohol ether sulfates as the anionic surfactant.

It is very particularly preferred for the composition to contain at least one anionic surfactant of formula (A-3),

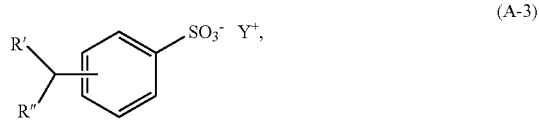

(A-3)

where
R' and R" are, independently of one another, H or alkyl, and together contain 9 to 19, preferably 9 to 15 and in particular 9 to 13, C atoms, and $Y^+$ denotes a monovalent cation or the n-th part of an n-valent cation (in particular $Na^+$).

In addition to the anionic surfactant, said multi-component detergents and particularly preferred second liquid compositions can also contain soaps. Saturated and unsaturated fatty acid soaps are suitable, such as the salts of lauric acid, myristic acid, palmitic acid, stearic acid, (hydrogenated) erucic acid and behenic acid, and in particular soap mixtures derived from natural fatty acids, such as coconut, palm kernel, olive oil or tallow fatty acids.

The anionic surfactants, and the soaps, can be present in the form of the sodium, potassium, magnesium or ammonium salts thereof. The anionic surfactants are preferably present in the form of the ammonium salts thereof, the ammonium ion being derived from at least one $(C_2\text{-}C_6)$-alkanolamine. Further preferred counterions for the anionic surfactants are also the protonated forms of choline, triethylamine, monoethanolamine, triethanolamine or methylethylamine.

The multi-component detergent according to the invention and particularly preferred first liquid compositions and particularly preferred second liquid compositions can (preferably together with at least one anionic surfactant) also have at least one non-ionic surfactant. The non-ionic surfactant comprises alkoxylated fatty alcohols, alkoxylated fatty acid alkyl esters, fatty acid amides, alkoxylated fatty acid amides, polyhydroxy fatty acid amides, alkylphenol polyglycol ethers, amine oxides, alkyl polyglucosides, and mixtures thereof. It is again particularly preferred if non-ionic surfactant is contained in a total amount of from 10 to 40 wt. %, in particular 15 to 35 wt. %, based on the weight of the composition according to the invention.

Alkoxylated, advantageously ethoxylated, in particular primary alcohols having preferably 8 to 18 C atoms and, on average, 4 to 12 mol ethylene oxide (EO) per mol of alcohol, in which the alcohol functional group can be linear or preferably methyl-branched in the 2 position, or can contain linear and methyl-branched functional groups in the mixture, as are usually present in oxo alcohol functional groups, are preferably used as the non-ionic surfactant. However, alcohol ethoxylates having linear functional groups of alcohols of native origin having 12 to 18 C atoms, for example of coconut, palm, tallow fatty or oleyl alcohol, and, on average, 5 to 8 EO per mol of alcohol are particularly preferred. Preferred ethoxylated alcohols include, for example, C12-14 alcohols having 4 EO or 7 EO, C9-11 alcohols having 7 EO, C13-15 alcohols having 5 EO, 7 EO or 8 EO, $C_{12\text{-}18}$ alcohols having 5 EO or 7 EO, and mixtures thereof. The degrees of ethoxylation indicated represent statistical averages that can correspond to an integer or a fractional number for a specific product. Preferred alcohol ethoxylates have a narrowed homolog distribution (narrow range ethoxylates, NRE). In addition to these non-ionic surfactants, fatty alcohols having more than 12 EO can also be used. Examples of these are tallow fatty alcohols having 14 EO, 25 EO, 30 EO, or 40 EO. Non-ionic surfactants that contain EO and PO (propylene oxide) groups together in the molecule can also be used according to the invention. Furthermore, a mixture of a (more highly) branched ethoxylated fatty alcohol and an unbranched ethoxylated fatty alcohol, such as a mixture of a $C_{16}$-$C_{18}$ fatty alcohol having 7 EO and 2-propylheptanol having 7 EO, is also suitable. The detergent particularly preferably contains a $C_{12}$-$C_{18}$ fatty alcohol having 7 EO or a $C_{13}$-$C_{15}$ oxo alcohol having 7 EO as the non-ionic surfactant.

The multi-component detergent according to the invention, in particular component K1, particularly preferably comprises at least one non-ionic surfactant of formula (N-1)

(N-1)

where
$R^3$ represents a linear or branched $C_8$-$C_{18}$ alkyl functional group, an aryl functional group or an alkyl aryl functional group, XO represents, independently of one another, an ethylene oxide (EO) group or a propylene oxide (PO) group, m represents integers of from 1 to 50.

In the above formula (N-1), $R^1$ represents a linear or branched, substituted or unsubstituted alkyl functional group. In a preferred embodiment of the present invention, $R^1$ is a linear or branched alkyl functional group having 5 to 30 C atoms, preferably 7 to 25 C atoms, and in particular 10 to 19 C atoms. Preferred functional groups $R^1$ are selected from decyl, undecyl, dodecyl, tridecyl, tetradecyl, pentadecyl, hexadecyl, heptadecyl, octadecyl, nonadecyl functional groups and mixtures thereof, the representatives having an even number of C atoms being preferred. Particularly preferred functional groups $R^1$ are derived from fatty alcohols having 12 to 19 C atoms, for example from coconut fatty alcohol, tallow fatty alcohol, lauryl alcohol, myristyl alcohol, cetyl alcohol or stearyl alcohol, or from oxo alcohols having 10 to 19 C atoms.

AO of formula (N-1) is an ethylene oxide (EO) group or propylene oxide (PO) group, preferably an ethylene oxide group. The index m in formula (N-1) is an integer of from 1 to 50, preferably 2 to 20, and more preferably 2 to 10. In particular, m is 3, 4, 5, 6 or 7. The composition according to the invention may contain mixtures of non-ionic surfactants which have different degrees of ethoxylation. Surfactants having degrees of alkoxylation/ethoxylation of at least 5 are preferred.

In summary, particularly preferred fatty alcohol alkoxylates are those of formula

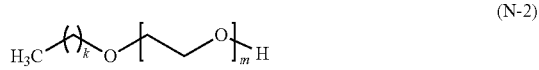

(N-2)

where k=9 to 17, and m=3, 4, 5, 6, or 7. Very particularly preferred representatives are fatty alcohols having 10 to 18 C atoms and having 7 EO (k=11-17, m=7 in formula N-2).

Fatty alcohol- or oxo alcohol ethoxylates of this kind are available under the trade names Dehydol® LT7 (BASF), Lutensol® A07 (BASF), Lutensol® M7 (BASF), and Neodol® 45-7 (Shell Chemicals).

The multi-component detergents according to the invention preferably contain at least one alkalizing agent or the salt thereof in a total amount of from 1 to 20 wt. %, preferably 2 to 15 wt. %. It is preferred that alkalizing agent is contained in component K1 and/or K2.

The total amount of the alkalizing agent and the salt thereof, or the total amount of all of the following preferred representatives, is calculated on the basis of the base form, i.e. if the alkalizing agent in the detergent according to the invention is present (partly) in its salt form, the counterion is disregarded in the amount calculation and only the base form without the absorbed proton is assumed for the salt content.

The alkalizing agents are preferably selected from ($C_2$ to $C_6$) alkanolamine, sodium hydroxide, potassium hydroxide, sodium carbonate, sodium hydrogen carbonate or mixtures thereof.

According to the invention, the term ($C_2$ to $C_6$) alkanolamine is understood to mean organic amine compounds which have a carbon skeleton of two to six carbon atoms to which at least one amino group (preferably exactly one amino group) and at least one hydroxyl group (again preferably exactly one hydroxyl group) binds.

Preferred ($C_2$ to $C_6$) alkanolamines according to the invention are primary amines.

In the context of the invention, it is preferred that at least one ($C_2$ to $C_6$) alkanolamine having exactly one amino group is used. It is also preferably a primary amine.

The composition according to the invention preferably contains at least one ($C_2$ to $C_6$) alkanolamine selected from 2-aminoethan-1-ol (monoethanolamine), tris(2-hydroxyethyl)amine (triethanolamine), 3-aminopropan-1-ol, 4-aminobutan-1-ol, 5-aminopentan-1-ol, 1-aminopropan-2-ol, 1-aminobutan-2-ol, 1-aminopentan-2-ol, 1-aminopentan-3-ol, 1-aminopentan-4-ol, 3-amino-2-methylpropan-1-ol, 1-amino-2-methylpropan-2-ol, 3-aminopropan-1,2-diol, 2-amino-2-methylpropan-1,3-diol (in particular 2-aminoethan-1-ol, 2-amino-2-methylpropan-1-ol, 2-amino-2-methyl-propan-1,3-diol), or mixtures thereof. Monoethanolamine has proven to be a very particularly suitable ($C_2$ to $C_6$) alkanolamine as an alkalizing agent.

($C_2$ to $C_6$) alkanolamine or the salt thereof is particularly preferably contained in a total amount of from 1 to 20 wt. %, preferably 2 to 15 wt. %, in the detergents according to the invention, in each case based on the basic form.

It has proven to be preferred according to the invention if the first liquid composition and/or the second liquid composition contains at least one organic solvent.

It is particularly preferred according to the invention if at least the first liquid composition contains at least one organic solvent.

The additional at least one organic solvent preferably has at least one hydroxyl group but no amino group and has a molecular weight of at most 500 g/mol.

Said at least one organic solvent is in turn preferably selected from ($C_2$-$C_8$) alkanols having at least one hydroxyl group (particularly preferably selected from the group ethanol, ethylene glycol, 1,2-propanediol, glycerol, 1,3-propanediol, n-propanol, isopropanol, 1,1,1-trimethylolpropane, 2-methyl-1,3-propanediol, 2-hydroxymethyl-1,3-propanediol, or mixtures thereof), triethylene glycol, butyl diglycol, polyethylene glycols having a weight-average molar mass Mw of at most 500 g/mol, glycerol carbonate, propylene carbonate, 1-methoxy-2-propanol, 3-methoxy-3-methyl-1-butanol, butyl lactate, 2-isobutyl-2-methyl-4-hydroxymethyl-1,3-dioxolane, 2,2-dimethyl-4-hydroxymethyl-1,3-dioxolane, dipropylene glycol, or mixtures thereof.

It is also particularly preferred if said organic solvent is contained in said liquid composition in a total amount of from 5 to 40 wt. %, in particular from 10 to 35 wt. %, based on the total weight of said liquid composition of a component of the multi-component detergent.

The multi-component detergent according to the invention preferably contains water. It is preferred if water is contained in a liquid composition of a component of the multi-component detergent (in particular component K1 and component K2) in a total amount between 0 and 45 wt. %, particularly preferably between 0 and 25 wt. %, based on the total weight of said liquid composition. The proportion of water in said liquid composition is very particularly preferably 25 wt. % or less, more preferably 20 wt. % or less, even more preferably 15 wt. % or less, in particular between 12 and 4 wt. %. The quantities in wt. % relate to the total weight of said liquid composition of a component of the multi-component detergent according to the invention.

The components of the multi-component detergent according to the invention can additionally contain at least one dye. This can be used to stain the component and/or as a bluing agent to increase the whiteness of the laundry. However, preferred multi-component detergents according to the invention are characterized in that component K1 of the multi-component detergent is substantially free of dyes which are different from the catechol metal complex compound of formula (I).

The multi-component detergent according to the invention preferably additionally contains at least one active substance in at least one of its components. Within the meaning of the present invention, active substances are in particular:

- textile care products such as plasticizers, water and stain repellents and impregnating agents, bleach activators, enzymes, silicone oils, anti-redeposition agents, optical brighteners, graying inhibitors, anti-shrink agents, anti-crease agents, dye transfer inhibitors, antimicrobial active ingredients, germicides, fungicides, antioxidants, antistatic agents, ironing aids, anti-swelling and anti-slip agents, UV absorbers, cationic polymers,
- skin care products or
- perfume (oil) or odorants.

At least one active substance is preferably selected from enzymes, optical brighteners, builders, solvents, anti-redeposition agents, dye transfer inhibitors, preservatives, perfume or mixtures of at least two of the aforementioned active substances.

The additional active substances are preferably contained in the components which do not substantially have a catechol compound according to formula (I), preferably in component K2.

The multi-component detergent may further contain an additional bleaching agent different from the catechol compound according to formula (I). In a preferred embodiment, substantially no further bleaching agent is contained.

It is preferred if the multi-component detergent according to the invention additionally contains at least one enzyme, in particular selected from protease, amylase, lipase, mannanase, cellulase, pectate lyase or mixtures thereof.

At the protein level, "variant" is the term corresponding to "mutant" at the nucleic acid level. The precursor or starting molecules can be wild-type enzymes, i.e. those which are obtainable from natural sources. They can also be enzymes which are already variants in themselves, i.e. which have already been modified compared to the wild-type molecules. These include, for example, point mutants, those having changes in the amino acid sequence, over a plurality of positions or longer contiguous regions, or also hybrid molecules which are composed of mutually complementary portions of different wild-type enzymes.

Amino acid exchanges are understood to mean substitutions of one amino acid for another amino acid. According to the invention, substitutions of this kind are indicated by the name of the positions at which the exchange takes place, optionally combined with the relevant amino acids, in the internationally used one-letter codes. "Exchange at position 320" means, for example, that a variant in the position that has the position 320 in the sequence of a reference protein has a different amino acid. Exchanges of this kind are usually carried out at the DNA level via mutations of individual base pairs (see above). "R320K" means, for example, that the reference enzyme at position 320 has the amino acid arginine, while the variant under consideration has the amino acid lysine at the position that can be homologated with it. "320K" means that any, e.g. usually a naturally predetermined, amino acid at a position which corresponds to position 320 is replaced by a lysine which is located precisely at this point in the present molecule. "R320K, L" means that the amino acid arginine is replaced by lysine or leucine at position 320. "R320X" means that the amino acid arginine is replaced in principle by any other amino acid at position 320.

In principle, the amino acid exchanges according to the invention and designated by the present application are not restricted to the fact that they are the only exchanges in which the variant in question differs from the wild-type molecule. It is known from the prior art that the advantageous properties of individual point mutations can complement one another. Thus, embodiments of the present invention include all variants which, in addition to other exchanges with respect to the wild-type molecule, also have the exchanges according to the invention.

Furthermore, in principle it does not matter in what order the particular amino acid exchanges have been carried out, i.e. whether a corresponding point mutant is further developed according to the invention or whether a variant according to the invention is first generated from a wild-type molecule which is developed further in accordance with other teaching to be found in the prior art. A plurality of exchanges can also be carried out simultaneously in a mutagenesis approach, for example according to the invention and other teaching together.

It is preferred according to the invention if at least one protease is contained as the enzyme. A protease is an enzyme that cleaves peptide bonds by hydrolysis. According to the invention, each of the enzymes from class EC 3.4 is included (including each of the thirteen subclasses which fall thereunder). The EC number corresponds to the Enzyme Nomenclature 1992 of the NC-IUBMB, Academic Press, San Diego, Calif., including supplements 1 to 5, published in Eur. J. Biochem. 1994, 223, 1-5; Eur. J. Biochem. 1995, 232, 1-6; Eur. J. Biochem. 1996, 237, 1-5; Eur. J. Biochem. 1997, 250, 1-6; and Eur. J. Biochem. 1999, 264, 610-650.

Subtilase designates a subgroup of serine proteases. Serine proteases or serine peptidases are a subgroup of proteases that have serine in the active center of the enzyme which forms a covalent adduct together with the substrate. Furthermore, the subtilases (and the serine proteases) are characterized in that they have two further amino acid residues in the active center in addition to said serine together with histidine and aspartame. The subtilases can be divided into 6 subclasses, specifically the subtilisin family, the thermitase family, the proteinase K family, the lantibiotic peptidase family, the kexin family and the pyrrolysine family. The proteases which are preferably excluded or preferably contained in reduced amounts as part of the compositions according to the invention are endopeptidases (EC 3.4.21).

According to the invention, "protease activity" is present if the enzyme has proteolytic activity (EC 3.4). Different types of protease activity are known. The three main types are:

trypsin-like, where the amide substrate is cleaved following the amino acids arg or lys at P1; chymotrypsin-like, where cleavage takes place following one of the hydrophobic amino acids at P1; and elastase-like, where the amide substrate is cleaved following Ala at P1.

The protease activity can be determined by the method described in *Tenside*, Volume 7 (1970), pp. 125-132. Accordingly, it is given in PU (protease units). The protease activity of an enzyme can be determined according to common standard methods, such as in particular using BSA as substrate (bovine albumin) and/or using the AAPF method.

Surprisingly, it was found that a protease of the type of alkaline protease from *Bacillus lentus* DSM 5483 or a protease sufficiently similar to this (based on the sequence identity) which has a plurality of these changes in combination is particularly suitable for use in the composition according to the invention and advantageously stabilized in an improved manner therein. Advantages of using this protease thus arise in particular with regard to wash performance and/or stability.

The identity of nucleic acid or amino acid sequences is determined by a sequence comparison. This sequence comparison is based on the commonly used BLAST algorithm established in the prior art (see, for example, Altschul, S. F., Gish, W., Miller, W., Myers, E. W. & Lipman, D. J. (1990) "Basic local alignment search tool." J. Mol. Biol. 215: 403-410, and Altschul, Stephan F., Thomas L. Madden, Alejandro A. Schaffer, Jinghui Zhang, Hheng Zhang, Webb Miller, and David J. Lipman (1997): "Gapped BLAST and PSI-BLAST: a new generation of protein database search programs"; Nucleic Acids Res., 25, S.3389-3402) and occurs in principle by similar sequences of nucleotides or amino acids in the nucleic acid or amino acid sequences being assigned to one another. The assignment of the relevant positions shown in a table is referred to as an alignment. Another algorithm available in the prior art is the FASTA algorithm. Sequence comparisons (alignments), in particular multiple sequence comparisons, are created using computer programs. The Clustal series (cf., for example, Chenna et al. (2003): Multiple sequence alignment with the Clustal series of programs. Nucleic Acid Research 31, 3497-3500), T-Coffee (cf. for example Notredame et al. (2000): T-Coffee: A novel method for multiple sequence alignments. J. Mol. Biol. 302, 205-217) or programs based on these programs or algorithms are frequently used. In the present invention, all sequence comparisons (alignments) were created using the computer program Vector NTI® Suite 10.3 (Invitrogen Corporation, 1600 Faraday Avenue, Carlsbad, Calif., USA) with the predetermined standard parameters, the AlignX module of which program for the sequence comparisons is based on ClustalW.

Such a comparison also allows conclusions to be drawn regarding the similarity of the compared sequences. It is usually given in percent identity, i.e. the proportion of identical nucleotides or amino acid residues in said sequences or in an alignment of corresponding positions. The broader concept of homology takes conserved amino acid exchanges into account in the case of amino acid sequences, i.e. amino acids having similar chemical activity, since they usually perform similar chemical activities within the protein. Therefore, the similarity between the compared sequences can also be expressed in percent homology or percent similarity. Identity and/or homology information can be provided regarding whole polypeptides or genes or only regarding individual regions. Homologous or identical regions of different nucleic acid or amino acid sequences are therefore defined by matches in the sequences. Such regions often have identical functions. They can be small and comprise only a few nucleotides or amino acids. Often, such small regions perform essential functions for the overall activity of the protein. It may therefore be expedient to relate sequence matches only to individual, optionally small regions. Unless stated otherwise, however, identity or homology information in the present application relates to the entire length of the particular nucleic acid or amino acid sequence indicated.

The concentration of the protease in the multi-component detergent, based on its total weight, is from 0.001-0.1 wt. %, preferably from 0.01-0.06 wt. %, based on active protein.

The compositions according to the invention (particularly preferably in addition to the protease) preferably contain at least one enzyme selected from α-amylase, cellulase, mannanase, lipase, pectate lyase as enzyme.

In general, the enzymes contained in a composition according to the invention can be adsorbed on carrier substances and/or embedded in coating substances to protect the enzymes from premature inactivation.

Compositions according to the invention can be added to the obtained enzymes in any form established according to the prior art. These include in particular the solid preparations which are obtained by granulation, extrusion or lyophilization and are advantageously as concentrated as possible, low in water and/or mixed with stabilizers. In an alternative dosage form, the enzymes can also be encapsulated, for example by spray-drying or extruding the enzyme solution together with a preferably natural polymer or in the form of capsules, for example those in which the enzymes are enclosed in a set gel, or in those of the core-shell type in which an enzyme-containing core is coated with a water-, air-, and/or chemical-impermeable protective layer. Further active ingredients such as stabilizers, emulsifiers, pigments, or dyes can additionally be applied in overlaid layers. Such capsules are applied using inherently known methods, for example by shaking or roll granulation or in fluidized bed processes. Advantageously, such granules are low in dust, for example due to the application of polymeric film-formers, and stable in storage due to the coating.

The compositions preferably additionally contain at least one cellulase. A cellulase is an enzyme. Synonymous terms can be used for cellulases, in particular endoglucanase, endo-1,4-beta-glucanase, carboxymethyl cellulase, endo-1,4-beta-D-glucanase, beta-1,4-glucanase, beta-1,4-endoglucanhydrolase, celludextrinase or avicelase. Crucial for whether an enzyme is a cellulase within the meaning of the invention is its ability to hydrolize 1,4-β-D-glucosidic bonds in cellulose.

Cellulases (endoglucanases, EG) which can be packaged according to the invention comprise, for example, the fungal cellulase preparation which is rich in endoglucanase (EG) and the developments thereof which are provided by Novozymes under the trade name Celluzyme®. The products Endolase® and Carezyme®, also available from Novozymes, are based on 50 kD-EG and 43 kD-EG, respectively, from *Humicola insolens* DSM 1800. Further commercial products from this company that can be used are Cellusoft®, Renozyme®, and Celluclean®. It is also possible to use cellulases, for example, which are available from AB Enzymes, Finland, under the trade names Ecostone® and Biotouch®, and which are, at least in part, based on 20 kD-EG from *Melanocarpus*. Further cellulases from AB Enzymes are Econase® and Ecopulp®. Further suitable cellulases are from *Bacillus* sp. CBS 670.93 and CBS 669.93, where the cellulase from *Bacillus* sp. CBS 670.93 is available from Danisco/Genencor under the trade name Puradax®. Further commercial products that can be used from Danisco/Genencor are "Genencor detergent cellulase L" and IndiAge®Neutra. Variants of these enzymes obtained by point mutations may also be used according to the invention. Particularly preferred cellulases are *Thielavia terrestris* cellulase variants which are disclosed in international patent specification WO 98/12307, cellulases from *Melanocarpus*, in particular *Melanocarpus albomyces*, which are disclosed in international patent specification WO 97/14804, cellulases of the EGIII type from *Trichoderma reesei* which are disclosed in the European patent application EP 1 305 432 or variants obtainable therefrom, in particular those which are disclosed in the European patent applications EP 1240525 and EP 1305432, and cellulases which are disclosed in the international patent specifications WO 1992006165, WO 96/29397 and WO 02/099091. Reference is therefore expressly made to each disclosure, and the disclosure content thereof in this regard is therefore expressly included in the present invention.

Particularly preferred compositions according to the invention are characterized in that at least one cellulase of a 20K-cellulase that can be obtained from *Melanocarpus* sp. or *Myriococcum* sp. or of such a cellulase that has a homology thereto of more than 80% (increasingly preferably of more than 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99.0%, 99.1%, 99.2%, 99.3%, 99.4%, 99.5%, 99.6%, 99.7%, 99.8% or 99.9%) as additional cellulase.

The 20K-cellulase which is obtained from *Melanocarpus* sp. or *Myriococcum* sp. is known from international patent application WO 97/14804. As described there, it has a molecular weight of approximately 20 kDa and has at least 80% of its maximum activity at 50° C. in the pH range of from 4 to 9, with almost 50% of the maximum activity remaining at 10 pH. As also described there, it can be isolated from *Melanocarpus albomyces* and produced in genetically engineered *Trichoderma reseei* transformants. Within the meaning of the present invention, cellulases which have a homology of more than 80% (increasingly preferably of more than 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99.0%, 99.1%, 99.2%, 99.3%, 99.4%, 99.5%, 99.6%, 99.7%, 99.8% or 99.9%) to 20K cellulase can also be used.

K20 cellulase is preferably used in amounts such that a composition according to the invention has a cellulolytic activity of from 1 NCU/g to 500 NCU/g (can be determined by the hydrolysis of 1 wt. % carboxymethyl cellulose at 50° C. and neutral pH and determination of the reducing sugar released in the process using dinitrosalicylic acid, as described by M. J. Bailey et al. in Enzyme Microb. Technol. 3: 153 (1981); 1 NCU defines the amount of enzyme that produces reducing sugar in an amount which corresponds to 1 nmol glucose per second), in particular from 2 NCU/g to 400 NCU/g and particularly preferably from 6 NCU/g to 200 NCU/g. In addition, the composition according to the invention can optionally contain further cellulases.

A composition according to the invention preferably contains 0.001 mg to 0.5 mg, in particular 0.02 mg to 0.3 mg, of cellulolytic protein per gram of the entire composition. The protein concentration can be determined using known methods, for example the bicinchonic acid process (BCA method, Pierce Chemical Co., Rockford, Ill.) or the biuret method (A. G. Gornall, C. S. Bardawill and M. M. David, J. Biol. Chem. 177, 751-766, 1948).

It is also particularly preferred according to the invention to use at least one further second cellulase which is different from the first cellulase in addition to at least one cellulase of a 20K-cellulase which can be obtained from *Melanocarpus* sp. or *Myriococcum* sp. or of such a cellulase which has a homology thereto of more than 80% (increasingly preferably of more than 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99.0%, 99.1%, 99.2%, 99.3%, 99.4%, 99.5%, 99.6%, 99.7%, 99.8% or 99.9%).

It is preferred according to the invention if the compositions according to the invention additionally contain at least one lipase. Preferred lipase enzymes according to the invention are selected from at least one enzyme of the group which is formed from triacylglycerol lipase (EC 3.1.1.3) and lipoprotein lipase (EC 3.1.1.34) and monoglyceride lipase (EC 3.1.1.23).

Furthermore, the lipase preferably contained in a composition according to the invention is naturally present in a microorganism of the species *Thermomyces lanuginosus* or *Rhizopus oryzae* or *Mucor javanicus* or is derived by mutagenesis from the aforementioned lipases which are naturally present. The compositions according to the invention particularly preferably contain at least one lipase which is naturally present in a microorganism of the species *Thermomyces lanuginosus* or is derived by mutagenesis from the aforementioned lipases which are naturally present in *Thermomyces lanuginosus*.

In this context, naturally present means that the lipase is a separate enzyme of the microorganism. The lipase can thus be expressed in the microorganism by a nucleic acid sequence which is part of the chromosomal DNA of the microorganism in its wild-type form. The lipase or the nucleic acid sequence coding for it is therefore present in the wild-type form of the microorganism and/or can be isolated from the wild-type form of the microorganism. In contrast, a lipase which is not naturally present in the microorganism or the nucleic acid sequence coding for it would have been introduced into the microorganism in a targeted manner using genetic engineering methods such that the microorganism would have been enriched with the lipase or the nucleic acid sequence coding for it. However, a lipase which is naturally present in a microorganism of the species *Thermomyces lanuginosus* or *Rhizopus oryzae* or *Mucor javanicus* may have been produced recombinantly by a different organism.

The fungus *Thermomyces lanuginosus* (also known as *Humicola lanuginosa*) belongs to the class Eurotiomycetes (subclass Eurotiomycetidae), therein to the order Eurotiales and therein to the family Trichocomaceae and the genus *Thermomyces*. The fungus *Rhizopus oryzae* belongs to the class Zygomycetes (subclass Incertae sedis), therein to the order Mucorales and therein again to the family Mucoraceae and the genus *Rhizopus*. The fungus *Mucor javanicus* also belongs to the class Zygomycetes (subclass Incertae sedis), here to the order Mucorales and again to the family Mucoraceae, and then to the genus *Mucor*. The names *Thermomyces lanuginosus*, *Rhizopus oryzae* and *Mucor javanicus* are the biological species names within the relevant genus.

Preferred lipases according to the invention are the lipase enzymes available from Amano Pharmaceuticals under the names Lipase M-AP10®, Lipase LE® and Lipase F® (also Lipase JV®). For example, Lipase F® is naturally present in *Rhizopus oryzae*. Lipase M-AP10®, for example, is naturally present in *Mucor javanicus*.

Compositions of a very particularly preferred embodiment of the invention contain at least one lipase which is selected from at least one or more polypeptides having an amino acid sequence which is at least 90% (and increasingly preferably at least 81%, 82%, 83%, 84%, 85%, 86%, 87%, 88%, 89%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99.0%, 99.1%, 99.2%, 99.3%, 99.4%, 99.5%, 99.6%, 99.7%, 99.8%, 99.9%) identical to the wild-type lipase from the strain DSM 4109 *Thermomyces lanugi-*

*nosus*. It is again preferred if, based on said wild-type lipase from strain DSM 4109, there is at least the amino acid mutation N233R.

Within the scope of a further embodiment, in particular the lipases which are derived from the wild-type lipase from strain DSM 4109 and are selected from at least one lipase enzyme according to the publication WO 00/60063 A1 can preferably be used according to the invention. Reference is expressly made in full to the disclosure in publication WO 00/60063 A1.

At least one lipase which is derived from the wild-type lipase from strain DSM 4109 and in which, based on said wild-type lipase, an electrically neutral or negatively charged amino acid is at least substituted by a positively charged amino acid is particularly preferably used in the compositions of the invention. The charge is determined in water at a pH of 10. Negative amino acids within the meaning of the invention are E, D, Y and C. Positively charged amino acids within the meaning of the invention are R, K and H, in particular R and K. Neutral amino acids within the meaning of the invention are G, A, V, L, I, P, F, W, S, T, M, N, Q and C, if C forms a disulfide bridge.

In the context of this embodiment of the invention, it is also preferred if, based on the wild-type lipase from strain DSM 4109, at least one of the following amino acid exchanges is present in positions D96L, T213R and/or N233R, particularly preferably T213R and N233R.

A highly preferred lipase is commercially available from Novozymes (Denmark) under the trade name Lipex® and can advantageously be used in the cleaning compositions according to the invention. The Lipase Lipex® 100 L (ex Novozymes A/S, Denmark) is particularly preferred. Preferred multi-component detergents according to the invention contain said lipase enzyme from Lipex® 100 L in a total amount of from 0.01 to 1.0 wt. %, in particular from 0.02 to 0.1 wt. %, based on the total weight thereof.

The compositions according to the invention can additionally contain at least one mannanase as the enzyme. A mannanase contained in the composition according to the invention (in particular in a preferred washing and cleaning agent according to the invention for textiles) catalyzes the hydrolysis of 1,4-beta-D-mannosidic bonds in mannans, galactomannans, glucomannans and galactoglucomannans as part of its mannanase activity. Said mannanase enzymes according to the invention are classified according to the enzyme nomenclature as EC 3.2.1.78.

The mannanase activity of a polypeptide or enzyme can be determined according to testing methods known from literature. For example, a test solution is placed into holes in an agar plate that have a diameter of 4 mm and contain 0.2 wt. % of AZGL galactomannan (carob), i.e. substrate for the endo-1,4-beta-D-mannanase essay, available under catalog number I-AZGMA from Megazyme (http://www.megazyme.com).

Suitable compositions according to the invention contain, for example, mannanase which is marketed under the name Mannaway® by Novozymes.

Mannanase enzymes have been identified in numerous *Bacillus* organisms.

WO 99/64619 discloses examples of liquid, protease-containing detergent compositions which have a high total surfactant content of at least 20 wt. % and additionally comprise mannanase enzyme.

The multicomponent detergents according to the invention more preferably contain mannanase in a total amount of from 0.01 to 1.0 wt. %, in particular 0.02 to 0.1 wt. %, based on the total weight thereof.

Particularly preferably, the composition according to the invention also contains at least one α-amylase, in addition to the preferred protease of the alkaline protease type from *Bacillus lentus* DSM 5483 or in addition to a protease which is sufficiently similar to this (based on the sequence identity) and has a plurality of these modifications in combination.

α-amylases (EC 3.2.1.1) hydrolyze α-1,4-glycosidic bonds of starch and starch-like polymers as internal enzymes. This α-amylase activity is measured, for example, according to the applications WO 97/03160 A1 and GB 1296839 in KNU (Kilo Novo Units). 1 KNU represents the amount of enzyme that hydrolyzes 5.25 g of starch (available from Merck, Darmstadt, Germany) per hour at 37° C., at a pH of 5.6 and in the presence of 0.0043 M calcium ions. An alternative activity determination method is the DNS method which is described for example in the application WO 02/10356 A2. The oligosaccharides, disaccharides and glucose units released by the enzyme during the starch hydrolysis are then detected by oxidizing the reducing ends with dinitrosalicylic acid (DNS). The activity is obtained in μmol reducing sugars (based on maltose) per min and ml; this results in activity values in TAU. The same enzyme can be determined using different methods, it being possible for the respective conversion factors to vary depending on the enzyme and therefore having to be determined on the basis of a standard. It can be roughly calculated that 1 KNU corresponds to approx. 50 TAU. A further activity determination method is measuring using the Quick-Start® test kits from Abbott, Abbott Park, Ill., USA.

A preferred field of application of the multi-component detergents according to the invention is the cleaning of textiles. Because washing and cleaning agents for textiles mainly have alkaline pH values, α-amylases, which are active in the alkaline medium, are in particular used for this purpose. These are produced and secreted by microorganisms, i.e. fungi or bacteria, especially those of the genera *Aspergillus* and *Bacillus*. Based on these natural enzymes, there is still an almost unmanageable abundance of variants which have been derived via mutagenesis and which have specific advantages depending on the field of application.

Examples of these are α-amylases from *Bacillus licheniformis*, from *B. amyloliquefaciens* and from *B. stearothermophilus*, as well as the developments thereof that have been improved for use in washing or cleaning agents. The enzyme from *B. licheniformis* is available from Novozymes under the name Termamyl® and from Genencor under the name Purastar®ST. Development products of this α-amylase are available from Novozymes under the trade names Duramyl® and Termamyl®ultra, from Genencor under the name Purastar®OxAm, and from Daiwa Seiko Inc., Tokyo, Japan, as Keistase®. The α-amylase from *B. amyloliquefaciens* is marketed by Novozymes under the name BAN®, and derived variants from the α-amylase from *B. stearothermophilus* are marketed under the names BSG® and Novamyl®, also by Novozymes.

Examples for α-amylases from other organisms are the developments of α-amylase from *Aspergillus niger* and *A. oryzae* that are available under the trade names Fungamyl® from Novozymes. A further commercial product is, for example, the amylase LT®.

The prior art includes, inter alia, the three patent applications WO 96/23873 A1, WO 00/60060 A2 and WO 01/66712 A2, which have been registered by Novozymes. WO 96/23873 A1 describes a plurality of different point mutations in a total of more than 30 different positions in four different wild-type amylases and claims that for all amylases having at least 80% identity to one of those four;

they should have modified enzymatic properties with regard to thermal stability, oxidation stability and calcium dependency. The application WO 00/60060 A2 also mentions a large number of possible amino acid exchanges in 10 different positions on the α-amylases from two different microorganisms and claims that for all amylases having a homology of at least 96% identity to them. Finally, WO 01/66712 A2 describes 31 different amino acid positions, some of which are identical to the above-mentioned positions, that have been mutated into one of the two α-amylases which are cited in the application WO 00/60060 A2.

WO 96/23873 A1, for example, specifically gives the possibility of replacing an M in position 9 in the aforementioned α-amylases with an L according to the counting of AA560, M in position 202 with L and deleting the amino acids in positions 182 and 183 (or 183 and 184). WO 00/60060 A2 specifically discloses, inter alia, the amino acid variation N195X (i.e. in principle with any other amino acid). WO 01/66712 A2 discloses, inter alia, the amino acid variations R18K, G186X (including in particular the G186R exchange which is not relevant here), N299X (including in particular the N299A exchange which is not relevant here), R320K, E345R and R458K.

In addition to the preferred protease of the alkaline protease type from *Bacillus lentus* DSM 5483 or a protease which is sufficiently similar to this (based on the sequence identity) which has several of these modifications in combination, the composition according to the invention very particularly preferably also contains at least one α-amylase which has a higher activity at temperatures between 10 and 20° C. than the amylase having the trade name "Stainzyme 12 L" from Novozymes.

According to the invention, multi-component detergents preferred according to the invention contain α-amylase in a total amount of from 0.01 to 1.0 wt. %, in particular from 0.02 to 0.1 wt. %, based on the total weight thereof.

It is preferred that at least one optical brightener is selected from the substance classes of distyrylbiphenyls, stilbenes, 4,4'-diamino-2,2'-stilbene disulfonic acids, cumarines, dihydroquinolones, 1,3-diarylpyrazolines, naphthalic acid imides, benzoxazole systems, benzisoxazole systems, benzimidazole systems, pyrene derivatives substituted with heterocycles, and mixtures thereof. These substance classes of optical brighteners have a high stability, a high light and oxygen resistance and a high affinity for fibers.

The following optical brighteners, which are selected from the group consisting of disodium-4,4'-bis-(2-morpholino-4-anilino-s-triazin-6-ylamino)stilbene disulfonate, disodium-2,2'-bis-(phenyl-styryl) disulfonate, 4,4'-bis[(4-anilino-6-[bis(2-hydroxyethyl)amino]-1,3,5-triazin-2-yl) amino]stilben-2,2'-disulfonic acid, hexasodium-2,2'-[vinylenbis[(3-sulphonato-4,1-phenylen)imino[6-(diethylamino)-1,3,5-triazin-4,2-diyl]imino]]bis-(benzol-1, 4-disulfonate), 2,2'-(2,5-thiophendiyl)bis[5-1,1-dimethylethyl)-benzoxazole (available, for example, as Tinopal® SFP from BASF SE) and/or 2,5-bis(benzoxazol-2-yl)thiophene, can be incorporated particularly well and in a stable manner.

According to the invention, the multi-component detergent can further comprise builders. Polymeric polycarboxylates are suitable as builders, for example. These are, for example, the alkali metal salts of polyacrylic acid or of polymethacrylic acid, for example those having a relative molecular mass of from 600 to 750,000 g/mol. Suitable polymers are in particular polyacrylates which preferably have a molecular mass of from 1,000 to 15,000 g/mol. Due to their superior solubility, the short-chain polyacrylates, which have molar masses of from 1,000 to 10,000 g/mol, and particularly preferably from 1,000 to 5,000 g/mol, can in turn be preferred from this group.

In addition, copolymeric polycarboxylates are suitable, in particular those of acrylic acid with methacrylic acid and those of acrylic acid or methacrylic acid with maleic acid. To improve water solubility, the polymers can also contain allyl sulfonic acids, such as allyloxybenzene sulfonic acid and methallyl sulfonic acid, as monomers.

Suitable builders that can be contained in the composition according to the invention are in particular also silicates, aluminum silicates (in particular zeolites), carbonates, salts of organic di- and polycarboxylic acids, and mixtures of these substances. Organic builders are particularly suitable as additional builders, for example the polycarboxylic acids which can be used in the form of the sodium salts thereof or as acids, polycarboxylic acids being understood to mean those carboxylic acids that carry more than one acid function. These include, for example, adipic acid, succinic acid, glutaric acid, malic acid, tartaric acid, maleic acid, fumaric acid, saccharic acids, aminocarboxylic acids, in particular glutamic acid-N,N-diacetic acid (GLDA) and methylglycine-N,N-diacetic acid (MGDA), and mixtures thereof. Polymeric polycarboxylates are also suitable as builders. These are, for example, the alkali metal salts of polyacrylic acid or of polymethacrylic acid, for example those having a relative molecular mass of from 600 to 750,000 g/mol. Suitable polymers are in particular polyacrylates which preferably have a molecular mass of from 1,000 to 15,000 g/mol. Due to their superior solubility, the short-chain polyacrylates, which have molar masses of from 1,000 to 10,000 g/mol, and particularly preferably from 1,000 to 5,000 g/mol, can in turn be preferred from this group. In addition, copolymeric polycarboxylates are suitable, in particular those of acrylic acid with methacrylic acid and those of acrylic acid or methacrylic acid with maleic acid. To improve water solubility, the polymers can also contain allyl sulfonic acids, such as allyloxybenzene sulfonic acid and methallyl sulfonic acid, as monomers. Soluble builders, such as acrylic polymers having a molar mass of from 1,000 to 5,000 g/mol, are preferably used in liquid components.

However, soluble builders, such as citric acid, or acrylic polymers having a molar mass of from 1,000 to 5,000 g/mol are particularly preferably used.

Additionally, the liquid components preferably also contain one or more non-aqueous solvents. Suitable non-aqueous solvents comprise mono- or polyhydric alcohols or glycol ethers, such as ethanol, n-propanol, i-propanol, butanols, glycol, propanediol, butanediol, methylpropanediol, glycerol, glycols, such as diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, 2,2-dimethyl-4-hydroxymethyl-1,3-dioxolane, propylene-glycol-t-butylether, di-n-octylether, and low-molecular polyalkylene glycols, such as PEG 400, and mixtures of these solvents.

Preferably, the solvents are selected from ethanol, n-propanol, i-propanol, butanols, glycol, propanediol, butanediol, methylpropanediol, glycerol, diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butylether, di-n-octylether, and mixtures of these solvents.

Additionally, the multi-component detergents according to the invention can also contain components which positively influence the capability for washing out oil and grease from textiles, or what are referred to as soil-release active ingredients. This effect is particularly apparent when a textile is soiled which has previously been washed several times using an agent which contains this deoiling and degreasing component. Preferred deoiling and degreasing components include, for example, non-ionic cellulose ethers such as methylcellulose and methyl hydroxypropyl cellulose having a proportion of from 15 to 30 wt. % of methoxyl groups and from 1 to 15 wt. % of hydroxypropoxyl groups, in each case based on the non-ionic cellulose ether, and the polymers of phthalic acid and/or terephthalic acid known from the prior art, or derivatives thereof, with monomeric and/or polymeric diols, in particular polymers of ethylene terephthalates and/or polyethylene glycol terephthalates or anionically and/or nonionically modified derivatives thereof. These are commercially available, for example, under the trade name Texcare®.

Anti-redeposition agents can be used in particular on (co)polymers based on polyethyleneimine, polyvinyl acetate and polyethylene glycol, preferably in mixtures with anti-redeposition agents.

The multi-component detergent can preferably also contain dye transfer inhibitors, preferably in amounts of from 0.1 wt. % to 2 wt. %, in particular from 0.1 wt. % to 1 wt. %, which, in a preferred embodiment of the invention, are polymers of vinylpyrrolidone, vinyl imidazole or vinyl pyridine-N-oxide or copolymers thereof.

The function of graying inhibitors is to keep the dirt that is removed from the textile fibers suspended in the liquor. Water-soluble colloids, which are usually organic, are suitable for this purpose, for example starch, sizing material, gelatin, salts of ethercarboxylic acids or ethersulfonic acids of starch or of cellulose, or salts of acidic sulfuric acid esters of cellulose or of starch. Water-soluble polyamides containing acid groups are also suitable for this purpose. Starch derivatives other than those mentioned above may also be used, for example aldehyde starches. Cellulose ethers, such as carboxymethyl cellulose (Na salt), methyl cellulose, hydroxyalkyl cellulose, and mixed ethers, such as methyl hydroxyethyl cellulose, methyl hydroxypropyl cellulose, methyl carboxymethyl cellulose and mixtures thereof, can preferably be used, for example, in amounts of from 0.1 to 5 wt. %, based on the multi-component detergent.

It is preferred for the dye transfer inhibitor to be a polymer or a copolymer of cyclic amines such as vinylpyrrolidone and/or vinylimidazole. Polymers suitable as a dye transfer inhibitors include polyvinylpyrrolidone (PVP), polyvinylimidazole (PVI), copolymers of vinylpyrrolidone and vinylimidazole (PVP/PVI), polyvinylpyridine-N-oxide, poly-N-carboxymethyl-4-vinylpyridium chloride, polyethylene glycol-modified copolymers of vinylpyrrolidone and vinylimidazole, and mixtures thereof. Particularly preferably, polyvinylpyrrolidone (PVP), polyvinylimidazole (PVI) or copolymers of vinylpyrrolidone and vinylimidazole (PVP/PVI) are used as dye transfer inhibitors. The polyvinylpyrrolidones (PVP) used preferably have an average molecular weight of 2,500 to 400,000 and are commercially available from ISP Chemicals as PVP K 15, PVP K 30, PVP K 60 or PVP K 90, or from BASF as Sokalan® HP 50 or Sokalan® HP 53. The copolymers of vinylpyrrolidone and vinylimidazole (PVP/PVI) used preferably have a molecular weight in the range of from 5,000 to 100,000 g/mol. A PVP/PVI copolymer is commercially available from BASF under the name Sokalan® HP 56, for example. Other dye transfer inhibitors that can be extremely preferably used are polyethylene glycol-modified copolymers of vinylpyrrolidone and vinylimidazole, which for example are available from BASF under the name Sokalan® HP 66.

The at least one liquid composition of the multi-component detergent according to the invention is preferably transparent or translucent. If a liquid composition according to the invention has a residual light power (transmission) of at least 20% based on the reference measurement in the spectral range between 380 nm and 780 nm, it is considered transparent within the meaning of the invention.

The transparency of the liquid composition according to the invention can be determined using various methods. The Nephelometric Turbidity Unit (NTU) is frequently used as an indication of transparency. It is a unit, used e.g. in water treatment, for measuring turbidity e.g. in liquids. It is a unit of turbidity measured using a calibrated nephelometer. High NTU values are measured for clouded compositions, whereas low values are determined for clear, transparent compositions.

The HACH Turbidimeter 2100Q from Hach Company, Loveland, Colo. (USA) is used with the calibration substances StabICal Solution HACH (20 NTU), StabICal Solution HACH (100 NTU) and StabICal Solution HACH (800 NTU), all of which can also be produced by Hach Company. The measurement is filled with the composition to be analyzed in a 10 ml measuring cuvette having a cap and is carried out at 20° C.

At an NTU value (at 20° C.) of 60 or more, liquid compositions have a perceptible turbidity within the meaning of the invention, as can be seen with the naked eye. It is therefore preferred if the liquid compositions according to the invention have an NTU value (at 20° C.) of at most 120, more preferably at most 110, even more preferably at most 100, particularly preferably of at most 80.

In the context of the present invention, the transparency of the detergents according to the invention was determined by a transmission measurement in the visual light spectrum over a wavelength range of from 380 nm to 780 nm at 20° C. To do this, a reference sample (water, deionized) is first measured in a photometer (Specord S 600 from AnalytikJena) with a cuvette (layer thickness 10 mm) that is transparent in the spectrum to be examined. The cuvette is then filled with a sample of the liquid composition according to the invention and measured again.

It is preferred if the transparent liquid composition according to the invention has a transmission (20° C.) of preferably at least 25%, more preferably at least 30%, even more preferably at least 40%, in particular at least 50%, particularly preferably at least 60%.

It is very particularly preferred if the transparent liquid composition according to the invention has a transmission (at 20° C.) of at least 30% (in particular of at least 40%, more preferably of at least 50%, particularly preferably of at least 60%) and an NTU value (at 20° C.) of at most 120 (preferably at most 110, more preferably at most 100, particularly preferably at most 80).

The multi-component detergent is used in particular in the context of a washing process for textiles. The compositions described herein are suitable as washing aids which are used as textile pre-treatment and post-treatment agents in textile washing, i.e. as agents with which the item of laundry is brought into contact before the actual washing, for example in order to dissolve stubborn stains.

Within the meaning of the invention, a surfactant-containing liquor is a liquid preparation for treating a substrate that can be obtained by using the multi-component detergent of the present invention by diluting it with at least one solvent (preferably water). Fabrics or textiles (such as clothing) can be used as substrates. The compositions according to the invention are preferably used to provide a surfactant-containing liquor for automatic cleaning methods, as are carried out, for example, by a washing machine for textiles.

The further components of the multi-component detergent can be present in any dosage form established according to the prior art and/or in any expedient dosage form. These include, for example, liquid, gel or pasty dosage forms. The container is preferably a pouch having two, three, four, five, six, seven or eight chambers, packaged both in large containers and in portions. In addition to components K1 and K2, at least one solid composition can also be included as a third component K3. However, it is very particularly preferred according to the invention if the multi-component detergent comprises only liquid components, the liquid components preferably being packaged separately from one another by a wrapping.

In a further particularly preferred embodiment, the multi-component detergent is a multi-component color detergent, in particular a liquid detergent, i.e. a textile detergent for colored textiles.

The container can be a pre-prepared portion for a wash cycle (e.g. as a water-soluble multi-chamber pouch) or a multi-chamber storage container having a possible mixing chamber.

According to the invention, the, in particular liquid, composition is preferably in a container (pouch) made of water-soluble material. The container for said multi-component detergent comprises at least two chambers (multi-chamber pouch), for example 2, 3, 4, 5, 6, 7 or 8 chambers. These chambers are separated from one another in such a way that the liquid or liquid and solid components of the detergent contained therein do not come into contact with one another. They can be separated, for example, by a wall made of the same material as the container itself.

It is therefore particularly preferred according to the invention to package the multi-component detergent in a container made of water-soluble material, in particular made of water-soluble film, having at least two separate chambers, component K1 being located in at least one chamber and component K2 being located in at least one different chamber.

A material is water-soluble within the meaning of the present invention if 0.1 g of the material dissolves in 800 mL water at 20° C. when stirred (stirring speed of magnetic stirrer 300 rpm, stirring rod: 6.8 cm long, diameter 10 mm, beaker 1000 mL low form from Schott, Mainz) within 600 seconds such that single solid particles of the material are no longer visible to the naked eye.

The water solubility of the material used for producing pouches for the wrapping can be determined by means of a square film of said material (film: 22×22 mm having a thickness of 76 m) fixed in a square frame (edge length on the inside: 20 mm) according to the following measurement protocol. Said framed film is submerged into 800 ml distilled water, temperature-controlled to 20° C., in a 1 liter beaker with a circular base (Schott, Mainz, beaker glass 1000 ml, low shape), so that the surface of the tensioned film is arranged at a right angle to the base of the beaker glass, the upper edge of the frame is 1 cm below the water surface, and the lower edge of the frame is oriented in parallel with the base of the beaker glass such that the lower edge of the frame extends along the radius of the base of the beaker glass and the center of the lower edge of the frame is arranged above the center of the radius of the beaker glass bottom. The material should dissolve within 600 seconds when stirred (stirring speed of magnetic stirrer 300 rpm, stirring rod: 6.8 cm long, diameter 10 mm), such that single solid film particles are no longer visible to the naked eye.

The water-soluble or water-dispersible material can comprise a polymer, a copolymer or mixtures thereof. Water-soluble polymers within the meaning of the invention are polymers which are soluble in water at more than 2.5 wt. % at room temperature.

Preferred water-soluble materials preferably comprise at least partly at least one substance from the group consisting of (acetalized) polyvinyl alcohol, polyvinyl pyrrolidone, polyethylene oxide, gelatin, polyvinyl alcohols substituted with sulphate, carbonate and/or citrate, polyalkylene oxides, acrylamides, cellulose esters, cellulose ethers, cellulose amides, cellulose, polyvinyl acetates, polycarboxylic acids and the salts thereof, polyamino acids or peptides, polyamides, polyacrylamides, copolymers of maleic acid and acrylic acid, copolymers of acrylamides and (meth)acrylic acid, polysaccharides, such as starch or guar derivatives, gelatin and materials with the INCI designations polyquaternium 2, polyquaternium 17, polyquaternium 18 and polyquaternium 27. The water-soluble material is particularly preferably a polyvinyl alcohol.

In one embodiment of the invention, the water-soluble material comprises mixtures of different substances. Such mixtures make it possible for the mechanical properties of the container to be adjusted and can influence the degree of water solubility.

The water-soluble material preferably contains at least one polyvinyl alcohol and/or at least one polyvinyl alcohol copolymer. "Polyvinyl alcohol" (abbreviated as PVAL, or occasionally also as PVOH) is the designation for polymers of the general structure

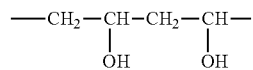

which also contain structural units in small proportions (about 2%) of the type

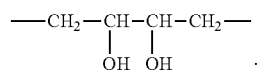

Commercially available polyvinyl alcohols, which are offered as a white-yellowish powder or granulate with degrees of polymerization in the range of from approximately 100 to 2,500 (molar masses of from approximately 4,000 to 100,000 g/mol), have degrees of hydrolysis of from 98 to 99 mol. % or 87 to 89 mol. %, so they still contain residual acetyl groups. The manufacturers characterize the polyvinyl alcohols by stating the degree of polymerization of the starting polymer, the degree of hydrolysis, the saponification number and the solution viscosity.

Depending on the degree of hydrolysis, polyvinyl alcohols are soluble in water and a few strongly polar organic solvents (formamide, dimethylformamide, dimethyl sulfoxide); they are not tackled by (chlorinated) hydrocarbons, esters, fats and oils. Polyvinyl alcohols are classified as toxicologically recognized as safe and are at least partly biodegradable. The water solubility can be reduced by post-treatment using aldehydes (acetalization), by complexing using Ni or Cu salts or by treatment using dichromates, boric acid or borax. The polyvinyl alcohol coatings are largely impervious to gases such as oxygen, nitrogen, helium, hydrogen and carbon dioxide, but allow water vapor to pass through.

In the context of the present invention, it is preferable for the water-soluble material at least partly to comprise a polyvinyl alcohol of which the degree of hydrolysis is from 70 to 100 mol. %, preferably from 80 to 90 mol. %, particularly preferably from 81 to 89 mol. %, and in particular from 82 to 88 mol. %. In a preferred embodiment, the water-soluble material consists of at least 20 wt. %, particularly preferably at least 40 wt. %, very particularly preferably at least 60 wt. %, and in particular at least 80 wt. % of a polyvinyl alcohol, of which the degree of hydrolysis is from 70 to 100 mol. %, preferably 80 to 90 mol. %, particularly preferably 81 to 89 mol. %, and in particular 82 to 88 mol. %.

The polyvinyl alcohols described above are widely available commercially, for example under the trademark Mowiol® (Clariant). Polyvinyl alcohols which are particularly suitable in the context of the present invention are, for example, Mowiole 3-83, Mowiol® 4-88, Mowiol® 5-88, Mowiol® 8-88 and L648, L734, Mowiflex LPTC 221 ex KSE and compounds from Texas Polymers such as Vinex 2034.

Preferred polyvinyl alcohol copolymers include, in addition to vinyl alcohol, dicarboxylic acids as further monomers. Suitable dicarboxylic acids are itaconic acid, malonic acid, succinic acid and mixtures thereof, with itaconic acid being preferred.

Polyvinyl alcohol copolymers which include, in addition to vinyl alcohol, an ethylenically unsaturated carboxylic acid, or the salt or ester thereof, are also preferred. Polyvinyl alcohol copolymers of this kind particularly preferably contain, in addition to vinyl alcohol, acrylic acid, methacrylic acid, acrylic acid ester, methacrylic acid ester or mixtures thereof.

The water solubility of polyvinyl alcohol polymer can be altered by post-treatment with aldehydes (acetalization) or ketones (ketalization). Particularly preferred and, due to their decidedly good solubility in cold water, particularly advantageous polyvinyl alcohols have been produced which can be acetalized or ketalized with the aldehyde or keto groups of saccharides or polysaccharides or mixtures thereof.

Furthermore, the water solubility can be altered and thus set at desired values in a targeted manner by complexing using Ni or Cu salts or by treatment using dichromates, boric acid, or borax. These are preferably not included. PVAL films are largely impermeable to gases such as oxygen, nitrogen, helium, hydrogen and carbon dioxide, but allow water vapor to pass through.

In addition to polyvinyl alcohol, polymers selected from the group comprising acrylic acid-containing polymers, polyacrylamides, oxazoline polymers, polystyrene sulfonates, polyurethanes, polyesters, polyethers, polylactic acid, and/or mixtures of the above polymers may additionally be added to the film material suitable as the water-soluble material.

Suitable water-soluble films for use as the water-soluble material of the water-soluble portion according to the invention are films which are sold by MonoSol LLC under the designation M8630 or M8720. Other suitable films include films named Solublon® PT, Solublon® KA, Solublon® KC or Solublon® KL from Aicello Chemical Europe GmbH or the films VF-HP from Kuraray.

Preferred water-soluble materials are characterized in that they comprise hydroxypropylmethyl cellulose (HPMC) which has a degree of substitution (average number of methoxy groups per anhydroglucose unit of the cellulose) of from 1.0 to 2.0, preferably from 1.4 to 1.9, and has a molar substitution (average number of hydroxypropoxyl groups per anhydroglucose unit of the cellulose) of from 0.1 to 0.3, preferably from 0.15 to 0.25.

Polyvinylpyrrolidones, abbreviated as PVP, are produced by radical polymerization of 1-vinylpyrrolidone. Commercially available PVPs have molar masses in the range of from approx. 2,500 to 750,000 g/mol and are offered as white, hygroscopic powders or as aqueous solutions.

Polyethylene oxides, PEOX for short, are polyalkylene glycols of the general formula

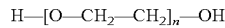

which are produced industrially by base-catalyzed polyaddition of ethylene oxide (oxirane) in mostly small water-containing systems which contain small amounts of water and have ethylene glycol as the primer. They usually have molar masses in the range of from approx. 200 to 5,000,000 g/mol, corresponding to degrees of polymerization n of from approx. 5 to >100,000. Polyethylene oxides have an extremely low concentration of reactive hydroxy end groups and only demonstrate weak glycol properties.

Gelatin is a polypeptide (molecular weight: approx. 15,000 to >250,000 g/mol) which is primarily obtained by hydrolysis of the collagen contained in the skin and bones of animals under acidic or alkaline conditions. The amino acid composition of the gelatin largely corresponds to that of the collagen from which it was obtained and varies depending on its provenance. The use of gelatin as a water-soluble coating material is extremely widespread, in particular in pharmaceutics in the form of hard or soft gelatin capsules. Gelatin is used only to a minor extent in the form of films because of its high price in comparison with the above-mentioned polymers.

In the context of the present invention, preference is given to water-soluble materials which comprise a polymer from the group starch and starch derivatives, cellulose and cellulose derivatives, in particular methyl cellulose and mixtures thereof.

Starch is a homoglycan, with the glucose units being linked α-glycosidically. Starch is made up of two components of different molecular weights (MW): of approx. 20 to 30% straight-chain amylose (MW approx. 50,000 to 150,000 g/mol) and 70 to 80% branched-chain amylopectin (MW approx. 300,000 to 2,000,000 g/mol). It also contains small amounts of lipids, phosphoric acid and cations. While the amylose forms long, helical, intertwined chains having approximately 300 to 1,200 glucose molecules due to the binding in the 1,4-position, the chain in amylopectin branches out after an average of 25 glucose building blocks by 1,6 binding to form a branch-like structure with about 1,500 to 12,000 molecules of glucose. In addition to pure starch, starch derivatives which can be obtained from polymer-analogous reactions from starch are also suitable for producing water-soluble containers in the context of the present invention. Chemically modified starches of this type in this case comprise products of esterification or etherification in which hydroxy hydrogen atoms have been substituted. However, starches in which the hydroxy groups have been replaced by functional groups which are not bound by an acid atom may also be used as starch derivatives. The group of starch derivatives includes, for example, alkali starches, carboxymethyl starch (CMS), starch esters and ethers and amino starches.

Pure cellulose has the formal gross composition ($C_6H_{10}O_5$) and is formally considered to be a ß-1,4-polyacetal of cellobiose, which itself is composed of two glucose molecules. In this case, suitable celluloses are composed of from approximately 500 to 5,000 glucose units and therefore have an average molecular mass of from 50,000 to 500,000 g/mol. Cellulose derivatives which can be obtained from cellulose by polymer-like reactions may also be used as cellulose-based disintegration agents in the context of the present invention. Chemically modified celluloses of this type in this case comprise products of esterification or etherification in which hydroxy hydrogen atoms have been substituted. However, celluloses in which the hydroxy groups have been replaced by functional groups which are not bound by an acid atom may also be used as cellulose derivatives. The group of cellulose derivatives includes, for example, alkali celluloses, carboxymethyl cellulose (CMC), cellulose esters and ethers as well as amino celluloses.

The water-soluble material can have further additives. These are, for example, plasticizers, such as dipropylene glycol, ethylene glycol or diethylene glycol, water or disintegrating agents.

Polyvinyl alcohol is particularly preferably used as the water-soluble material. This is easy to process and inexpensive to maintain. In addition, it is particularly soluble in water and thus makes it possible for the produced container to be used in a variety of ways.

Multi-component detergent to be assembled in a container made of water-soluble material, in particular of water-soluble film, having at least two separate chambers, component K1 being located in at least one chamber and component K2 being located in at least one different chamber.

Accordingly, multi-component detergents which comprise at least two components and are contained in a container made of water-soluble material, in particular of water-soluble film (in particular containing polyvinyl alcohol or a polyvinyl alcohol copolymer), having at least two separate chambers, are preferred, where a first component K1 is a first liquid composition, containing at least one catechol metal complex compound of formula (I)

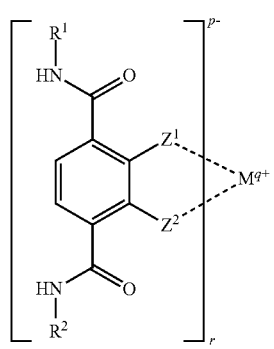

where
$R^1$ and $R^2$ represent, independently of one another, a hydrocarbon functional group having 1 to 20 carbon atoms that is optionally substituted by at least one functional group selected from hydroxy, ($C_1$-$C_4$)-alkoxy, ($C_1$-$C_4$)-alkoxy ($CH_2CH_2O)_n$—, —NR'R" or —N+R'R"R'"X$^-$, where n=1 to 10, R', R" and R'" represent, independently of one another, H or a linear or branched aliphatic hydrocarbon functional group having 1 to 3, preferably 1 to 2, carbon atoms and X$^-$ represents an anion, $Z^1$ and $Z^2$ represent, independently of one another, OH or O$^-$, M represents a metal cation of a transition metal or lanthanide, (in particular a metal cation made of Ti, Zr, Hf, V, Nb, Ta, Cr, Mo, W, Mn, Fe, Ru, Co, Ni, Cu, Zn, Ce or Sm), q represents, as a charge number of the metal cation M, the number 2, 3 or 4, p represents, as a charge number of the catechol ligand, the number 0, 1 or 2, r represents the number 1, 2, 3 or 4, and at least one free catechol compound of formula (II) or the salt thereof

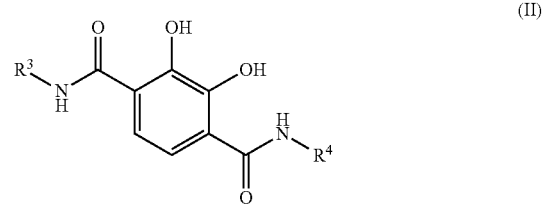

where
$R^3$ and $R^4$ represent, independently of one another, a hydrocarbon functional group having 1 to 20 carbon atoms that is optionally substituted by at least one functional group selected from hydroxy, ($C_1$-$C_4$)-alkoxy, ($C_1$-$C_4$)-alkoxy ($CH_2CH_2O)_n$—, —NR'R" or
N+R'R"R'"X$^-$, where n=1 to 10, R', R" and R'" represent, independently of one another, H or a linear or branched aliphatic hydrocarbon functional group having 1 to 3, preferably 1 to 2, carbon atoms and X$^-$ represents an anion, with the proviso that the catechol compound of formula (II) and the salt thereof are different from the compounds of formula (I), and a second component K2 is a second liquid composition, containing at least one surfactant. It is again preferred if the second component K2 and any optionally present additional components of the multi-component detergent of this embodiment are substantially free of compounds of formula (I) and compounds of formula (II).

The preferred embodiments of component K1 and/or component K2 and/or the water-soluble material of the container described above are also considered to be preferred.

Regardless of this, it is preferred according to the invention if at least one bittering agent is contained in the multi-component detergent in order to increase product safety. It is preferred if the bittering agent is contained in component K1 and/or in component K2 and/or in the water-soluble material of the container, in particular in the water-soluble film.

Preferred bittering agents have a bitter value of at least 1,000, preferably at least 10,000, particularly preferably at least 200,000. In order to determine the bitter value, the European Pharmacopoeia (5th Edition, Grundwerk, Stuttgart 2005, Volume 1, General Part, Monograph Groups, 2.8.15 bitter value p. 278) uses the standardized procedures described. An aqueous solution of quinine hydrochloride, of which the bitter value is fixed at 200,000, is used as a comparison. This means that 1 gram of quinine hydrochloride makes 200 liters of water bitter. The inter-individual taste differences in the organoleptic examination of bitterness are compensated for by a correction factor.

Very particularly preferred bittering agents are selected from denatonium benzoate, glycosides, isoprenoids, alkaloids, amino acids and mixtures thereof, particularly preferably denatonium benzoate.

Glycosides are organic compounds of the general structure R—O—Z, in which an alcohol (R—OH) is linked to a sugar part (Z) by means of a glycosidic bond.

Suitable glycosides are, for example, flavonoids such as quercetin or naringin or iridoidglycoside such as aucubin and in particular secoiridoid, such as amarogentin, dihydrofoliamentin, gentiopicroside, gentiopikrin, swertiamarin, sweroside, gentioflavoside, centauroside, methiafolin, harpagoside and centapikrin, sailicin or condurangin.

Isoprenoids are compounds which are formally derived from isoprene. Examples are in particular terpenes and terpenoids.

Suitable isoprenoids comprise, for example, sequiterpene lactones such as absinthin, artabsin, cnicin, lactucin, lactucopikrin or salonitenolide, monoterpene ketones (thujones) such as α-thujon or β-thujone, tetranortriterpenes (limonoids) such as deoxylimones, desoxylimonic acid, limonin, ichangin, iso-obacunonic acid, obacunone, obacunonic acid, nomilin or nomilic acid, terpenes such as marrubin, premarrubin, carnosol, carnosolic acid or quassin.

Alkaloids refer to naturally occurring, chemically heterogeneous, mostly alkaline, nitrogen-containing organic compounds of secondary metabolism that act on the animal or human organism.

Suitable alkaloids are, for example, quinine hydrochloride, quinine hydrogen sulfate, quinine dihydrochloride, quinine sulfate, columbine and caffeine.

Suitable amino acids comprise, for example, threonine, methionine, phenylalanine, tryptophan, arginine, histidine, valine and aspartic acid.

Particularly preferred bitters are quinine sulfate (bitter value=10,000), naringin (bitter value=10,000), sucrose octaacetate (bitter value=100,000), quinine hydrochloride, denatonium benzoate (bitter value >100,000,000) and mixtures thereof, very particularly preferably denatonium benzoate (for example available as Bitrex®).

Based on the total weight thereof, the water-soluble material preferably contains bittering agents (particularly preferably denatonium benzoate) in a total amount of at most 1 part by weight bittern to 250 parts by weight viscoelastic, solid composition (1:250), particularly preferably at most 1:500, very particularly preferably of at most 1:1,000.

It is preferred to use the multi-component detergent according to the invention for washing textiles, in particular for removing bleachable stains, very particularly preferably for removing stains which are based on constituents and residues of deodorants, rust, berries, tea and red wine.

As already mentioned, the stain can be pretreated using the composition according to the invention before the actual washing process and/or initially a surfactant-containing liquor is provided as a washing solution which contains the multi-component detergent according to the invention and is then brought into contact with the textiles to be cleaned.

Methods for cleaning textiles are generally characterized by the fact that, in a plurality of method steps, various cleaning-active substances are applied to the material to be cleaned and washed off after the exposure time, or in that the material to be cleaned is otherwise treated with a detergent or a solution of the composition.

A further object of the invention is therefore a method for washing textiles, comprising the steps of:
  adding a multi-component detergent according to the invention to a fabric or textile; and
  carrying out a washing procedure, preferably in a washing machine.

Preferably it is a method for treating textiles, comprising the method steps of:
  (a) providing an aqueous liquor by mixing 0.5 liters to 40.0 liters of water with 0.5 to 100 g of a multi-component detergent according to the invention; and
  (b) bringing a textile into contact with an aqueous liquor prepared according to step (a).

It is preferred if, in step (b), the textile is in contact with the aqueous liquor prepared according to (a) for 10 to 240 minutes, in particular 20 to 180 minutes.

It is further preferred if the textile is rinsed and dried after step (b).

It is particularly preferred that the method is carried out in an automatic washing machine. Before step (a), the textile is placed in the drum of the washing machine. A multi-component detergent according to the invention is filled into the dispensing chamber of the washing machine or added to the drum of the washing machine together with the textiles. It is preferred for the multi-component detergent according to the invention to be added together with the textiles into the drum of the washing machine.

Then 0.5 to 40 liters of water are added and mixed. Remarkably, each of the textiles is not dyed by the catechol metal complex compound according to the invention. This applies even if the detergent or multi-component detergent according to the invention is dispensed into the drum of the washing machine and comes into direct contact with the textile.

In order to prepare said solution, it is preferred according to the invention for 10 to 110 g, in particular 15 to 100 g, of the multi-component detergent according to the invention to be mixed with 5 to 25 l of water, in particular with 10 to 20 l of water.

In the method described, temperatures of 60° C. or less, for example 50° C. or less, are used in different embodiments of the invention. These temperature specifications relate to the temperatures used in step (b).

As already mentioned, the stains can be pretreated using the multi-component detergent according to the invention before the actual washing method and/or initially a surfactant-containing liquor is provided as a washing solution which contains the multi-component detergent according to the invention and is then brought into contact with the textiles to be cleaned.

All of the embodiments described herein in connection with the multi-component detergent of the invention, in particular with regard to the specification of the ingredients, are equally applicable to the methods and uses described and vice versa.

EXAMPLES 1.0 Preparation and Isolation of the Colored Complexes Using N,N'-Dipropyl-2,3-dihydroxyterephthaldiamide (Ligand L)

0.3 mmol of N,N'-dipropyl-2,3-dihydroxyterephthaldiamide (ligand L) was dissolved in 10 ml of methanol. 0.3 mmol of KOH (as a 0.5 M solution in methanol) was added to this while stirring. 0.1 mmol of the metal (III) chloride or 0.15 mmol of the metal (II) chloride was dissolved in 4 mL of methanol. This solution was then added to the first solution. After a stirring time of one hour, the resulting solution was concentrated to 4 mL and then 50 mL of diethyl ether was added. The precipitated metal complex was isolated by filtration.

Colored powders of the following metal complexes Fe(III)L$_3$ (red), Ce(III)L$_3$ (violet) and Mn(II)L$_2$ (green) were produced in this way.

A solution for each dye and pH at pH 8, pH 9.5 and pH 10 were prepared from a spatula tip of a dye with pH adjustment using NaOH. An increase in the pH of each of the solutions did not lead to any visible change in color.

UV/VIS spectra were absorbed by the complexes Fe(III) L$_3$ (red), Ce(III)L$_3$ (violet) and Mn(II)L$_2$ (green) in aqueous solution at pH 8 (NaOH) and 20° C.

TABLE 1

Maxima in the UV/VIS spectrum at a wavelength between 400 and 800 nm

| Catechol metal complex | Maximum (wavelength in nm) |
|---|---|
| Fe(III)L$_3$ | 444 (shoulder 495) |
| Ce(III)L$_3$ | 531 |
| Mn(II)L$_2$ | 626 |

2.0 Production of Multi-Component Detergents According to the Invention

For the production of a multi-component detergent in a 2-chamber pouch, the following first liquid compositions FZ1 according to the invention were initially produced as component K1 according to Table 2 while stirring.

TABLE 2 first liquid composition as component K1

| | FZ1 [wt. %] |
|---|---|
| N,N'-dipropyl-2,3-dihydroxyterephthaldiamide | 10.0 |
| C$_{13-15}$ alkyl alcohol branched at the 2 position, ethoxylated with 8 mol ethylene oxide | 70.0 |
| Fe(III)L$_3$ | 0.005 |
| Ethanol | to make up to 100 |

The following second liquid composition FZ2 according to the invention was also produced as component K2 according to Table 3 while stirring.

TABLE 3 second liquid composition as component K2

| | FZ2 [wt. %] |
|---|---|
| C$_{11-13}$ alkylbenzene sulfonic acid | 22.0 |
| C$_{13-15}$ alkyl alcohol branched at the 2 position, ethoxylated with 8 mol ethylene oxide | 24.0 |
| Glycerol | 10.5 |
| 2-aminoethanol | 6.0 |
| Ethoxylated polyethyleneimine | 6.0 |
| C$_{12-18}$ fatty acid | 7.5 |
| Diethylentriamin-N,N,N',N',N''-penta (methylenephosphonic acid), heptasodium salt | 0.7 |
| 1,2-propylene glycol | 8.2 |
| Ethanol | 3.0 |
| Sodium bisulfite | 0.1 |
| Denatonium benzoate | 0.001 |
| Soil-release polymers of ethylene terephthalate and polyethylene oxide terephthalate | 1.4 |

TABLE 3-continued second liquid composition as component K2

| | FZ2 [wt. %] |
|---|---|
| Optical brightener | 0.6 |
| Perfume | 1.7 |
| Protease, amylase, lipase, cellulase | 0.8 |
| Blue dye (no catechol compound according to the invention of formula (I)) | 0.005 |
| Water | to make up to 100 |

In order to wrap the components in water-soluble material, a polyvinyl alcohol-based film M8630 from Monosol (88 m) that contains denatonium benzoate was stretched onto a heatable mold having a double cavity. The stretched film was heated at 105° C. for 2400 ms and then pulled into the cavity by a vacuum. Then 8.4 g of the first liquid composition from Table 2 were filled into the first cavity by means of a syringe, and then 16.6 g of the liquid composition FZ2 from Table 3 were added to the second cavity by means of a syringe. An upper film (M8630, 90 m) was then applied in order to close the cavities and heat-sealed (150° C., 1000 ms) to the first film. After breaking the vacuum, the portion of the cavity obtained was removed.

The multi-component detergents according to the invention obtained in this way were 3.0 Washing Attempts In addition, washing tests were carried out with the detergents F1 and F3 in Table 2 in accordance with the following test conditions.

White fabrics (WFK 10A, WFK 20A and WFK 30A) were washed in a Miele washing machine type 318 at 16° D and 40° C. in a short program twice in succession with 35 g of powder detergent from the commercial product "Weißer Riese Universal". A wash cycle without detergent was then carried out. Fabric WFK 10 A is referred to by "wfk Testgewebe GmbH" as "Standard Cotton", WFK 20A is referred to as "Polyester/Cotton (65%/35%)" and WFK 30A is referred to as "polyester".

The multi-component detergent according to the invention was placed in the drum of a Miele washing machine type 318. The pre-washed, white fabrics (WFK 10A, WFK 20A and WFK 30A) as described above were then placed in the drum in addition to 23 white towels, 5 white terry towels and 6 white t-shirts (washing load total 3 kg) and washed in the main wash for 60 minutes at 16° D and 40° C., then rinsed and hung dry. This procedure was carried out 3 times in a row.

After the washing procedure, the white fabrics showed no discoloration and no stained colorings. This proves that the catechol metal complex used according to the invention does not stain the textile even with repeated washing.

What is claimed is:

1. A multi-component detergent, comprising at least two components, that is packaged in a container having at least two chambers, wherein a first component K1 is a first liquid composition, containing at least one catechol metal complex compound of formula (I)

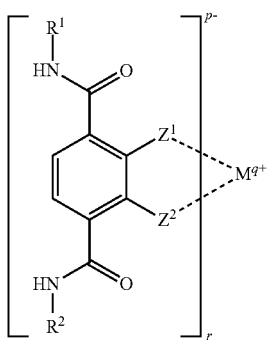

(I)

where
R$^1$ and R$^2$ represent, independently of one another, a hydrocarbon functional group having 1 to 20 carbon atoms that is optionally substituted by at least one functional group selected from hydroxy, (C$_1$-C$_4$)-alkoxy, (C$_1$-C$_4$)-alkoxy(CH$_2$CH$_2$O)$_{n-}$, —NR'R" or —N+R'R"R'"X$^-$, where n=1 to 10, R', R" and R'" represent, independently of one another, H or a linear or branched aliphatic hydrocarbon functional group having 1 to 3 carbon atoms and X$^-$ represents an anion, Z$^1$ and Z$^2$ represent, independently of one another, OH or O$^-$, M represents a metal cation of a transition metal or lanthanide, q represents, as a charge number of the metal cation M, the number 2, 3 or 4, p represents, as a charge number of the catechol ligand, the number 0, 1 or 2, r represents the number 1, 2, 3 or 4, and at least one free catechol compound of formula (II) or the salt thereof

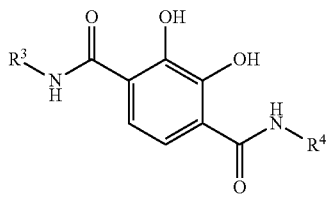

(II)

where
R$^3$ and R$^4$ represent, independently of one another, a hydrocarbon functional group having 1 to 20 carbon atoms that is optionally substituted by at least one functional group selected from hydroxy, (C$_1$-C$_4$)-alkoxy, (C$_1$-C$_4$)-alkoxy(CH$_2$CH$_2$O)$_{n-}$, —NR'R" or —N+R'R"R'"X$^-$, where n=1 to 10, R', R" and R'" represent, independently of one another, H or a linear or branched aliphatic hydrocarbon functional group having 1 to 3 carbon atoms and X$^-$ represents an anion, with the proviso that the catechol compound of formula (II) and the salt thereof are different from the compounds of formula (I), and a second component K2 is a second liquid composition, containing at least one surfactant, and wherein the first component K1 is located in at least one chamber and the second component K2 is located in at least one different chamber.

2. The multi-component detergent according to claim 1 wherein, in formula (I), the functional groups R$^1$ and R$^2$ represent, independently of one another, an alkyl group, an alkoxyalkyl group, a hydroxyalkyl group, a hydroxyalkyloxyalkyl group, (N-hydroxyethyl)-aminoethyl, (N-methoxyethyl)-aminoethyl or (N-ethoxyethyl)-aminoethyl, or an aromatic group.

3. The multi-component detergent according to claim 2 wherein, in formula (I), the functional groups R$^1$ and R$^2$ represent, independently of one another, an alkyl group, an alkoxyalkyl group, a hydroxyalkyl group, a hydroxyalkyloxyalkyl group, (N-hydroxyethyl)-aminoethyl, (N-methoxyethyl)-aminoethyl, (N-ethoxyethyl)-aminoethyl, methyl, ethyl, n-propyl, isopropyl, n-butyl, sec-butyl, tert-butyl, iso-butyl, n-pentyl, iso-pentyl, neopentyl, hexyl, 2-hydroxyethyl, 2-hydroxypropyl, 3-hydroxypropyl, 2-methoxyethyl, 2-ethoxyethyl, 3-methoxypropyl, 3-ethoxypropyl, or phenyl.

4. The multi-component detergent according to claim 1 wherein, in formula (I), the functional groups R$^1$ and R$^2$ are identical.

5. The multi-component detergent according to claim 1 wherein, in formula (I), M is selected from Fe, Mn, Cr, Ni, Co, Ce, Cu or hydrates of these metal ions.

6. The multi-component detergent according to claim 1 wherein, in formula (I) M represents a metal cation made of Ti, Zr, Hf, V, Nb, Ta, Cr, Mo, W, Mn, Fe, Ru, Co, Ni, Cu, Zn, Ce or Sm.

7. The multi-component detergent according to claim 1, wherein the catechol metal complex compound of formula (I) absorbs light in a wavelength of 400 to 800 nm, measured by means of a two-beam spectrophotometer at a concentration of the complex of 10$^{-5}$ mol/L in water at 20° C., a pH of 8 and a layer thickness of 1 cm.

8. The multi-component detergent according to claim 1, wherein the catechol metal complex compound of formula (I) is contained in component K1 from 0.001 to 10.0 wt. % based on the total weight of the first liquid composition.

9. The multi-component detergent according to claim 1, wherein the free catechol compound of formula (II) is contained in component K1 in a total amount of from 0.5 to 50 wt. % based on the total weight of the first liquid composition.

10. The multi-component detergent according to claim 1, wherein the first liquid composition of component K1 contains at least one organic solvent.

11. The multi-component detergent according to claim 1, wherein the first liquid composition of component K1 contains at least one surfactant.

12. The multi-component detergent according to claim 11, wherein the first liquid composition of component K1 contains at least one non-ionic surfactant.

13. The multi-component detergent according to claim 1, wherein the second component and optionally additional components of the multi-component detergent are substantially free of compounds of formula (I) and compounds of formula (II).

14. The multi-component detergent according to claim 1, wherein the free catechol compound of formula (II) is contained in a total amount of from 0.1 to 10.0 wt. % based on the total weight of the multi-component detergent.

15. The multi-component detergent according to claim 1, wherein at least one further component is contained, the further components each being a powdery composition or a granulate.

16. The multi-component detergent according to claim 1, wherein the multi-component detergent contains a bittering agent.

17. The multi-component detergent according to claim 1, wherein the liquid composition of component K1 or component K2 of the multi-component detergent contains water, in an amount between 0 and 25 wt. %, based on the total weight of said liquid composition.

18. The multi-component detergent according to claim 1, wherein said container is made of a water-soluble film.

19. A method for washing textiles, comprising the steps of:

adding a multi-component detergent, according to claim 1, to a fabric or textiles; and carrying out a washing procedure.

\* \* \* \* \*

UNITED STATES PATENT AND TRADEMARK OFFICE
CERTIFICATE OF CORRECTION

PATENT NO. : 11,566,206 B2
APPLICATION NO. : 17/228601
DATED : January 31, 2023
INVENTOR(S) : Frank Meier et al.

It is certified that error appears in the above-identified patent and that said Letters Patent is hereby corrected as shown below:

In the Specification

Column 7, Line 25 change "$10^5$ mol/L" to --$10^{-5}$ mol/L--.

Column 8, Line 49 change "–$N^+R'R^2R^3X^-$" to -- –$N^+R^1R^2R^3X^-$--.

Column 19, Line 54 change "Rockford, I11" to --Rockford, IL--.

Column 36, Line 24 change "(M8630, 90 m)" to --(M8630, 90 µm)--.

Signed and Sealed this
Nineteenth Day of September, 2023

Katherine Kelly Vidal
*Director of the United States Patent and Trademark Office*